United States Patent [19]
Midler, Jr.

[11] 3,892,539
[45] July 1, 1975

[54] PROCESS FOR PRODUCTION OF CRYSTALS IN FLUIDIZED BED CRYSTALLIZERS

[75] Inventor: Michael Midler, Jr., Clark, N.J.

[73] Assignee: Merck & Co., Inc., Rahway, N.J.

[22] Filed: Dec. 20, 1971

[21] Appl. No.: 210,220

Related U.S. Application Data

[60] Continuation of Ser. No. 861,231, Sept. 26, 1969, which is a division of Ser. No. 626,749, March 29, 1967, Pat. No. 3,510,266.

[52] U.S. Cl. .................. 23/301 R; 23/296; 23/300
[51] Int. Cl. ............................................. B01d 9/02
[58] Field of Search ...... 23/301 R, 273 R, 296, 300; 260/707

[56] References Cited
UNITED STATES PATENTS

| | | | |
|---|---|---|---|
| 3,266,871 | 8/1966 | Mizoguchi et al. | 23/273 |
| 3,383,180 | 5/1968 | Kralik et al. | 23/301 |
| 3,450,751 | 6/1969 | Noyori et al. | 23/273 F |

Primary Examiner—Wilbur L. Bascomb, Jr.
Assistant Examiner—R. T. Foster
Attorney, Agent, or Firm—Harry E. Westlake, Jr.; Michael C. Sudol, Jr.; Francis H. Deef

[57] ABSTRACT

A fluidized bed crystallizer has a relatively long tapered crystallizer column beneath a generally cylindrical column, with product withdrawal at a point below the top of the fluidized bed and above the bottom of the tapered column. The oversize crystals which fall to the bottom of the tapered column against the flow of the fluidized liquid are fractured by falling into or near an ultrasonic cavitation zone created there by a transducer driven at an ultrasonic frequency. The resulting crystal breakup produces a relatively small amount of fines. The fractured crystals are carried upward by the high velocity of the fluidizing liquid at the bottom of the tapered column, and serve as new seed on which crystallization takes place, and thus effectively replace the particles withdrawn as product.

13 Claims, 9 Drawing Figures

INVENTOR
MICHAEL MIDLER JR.

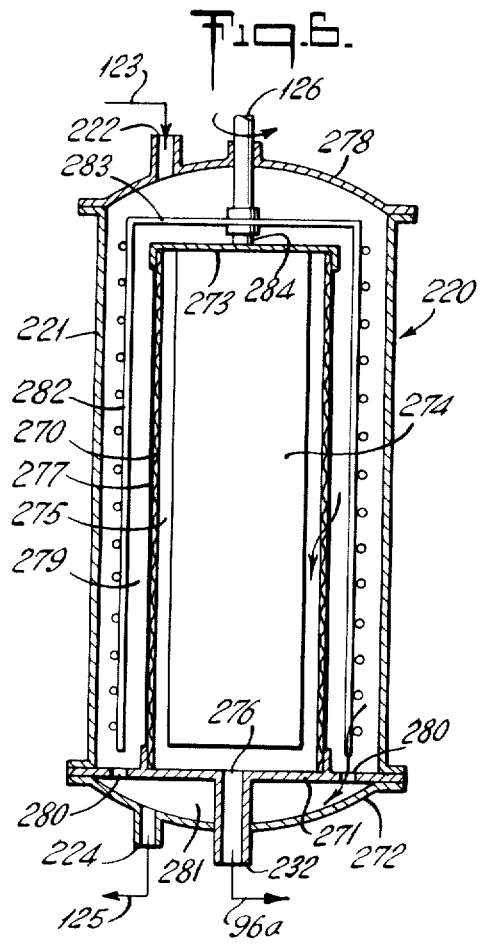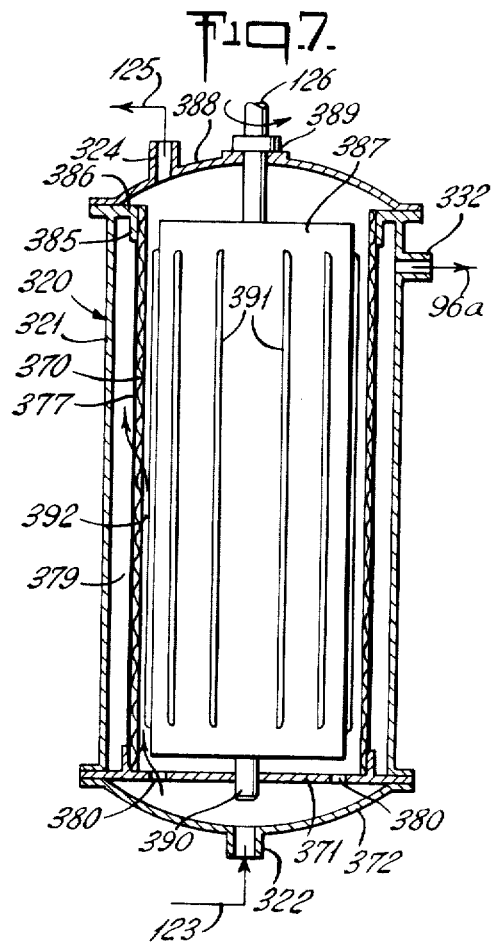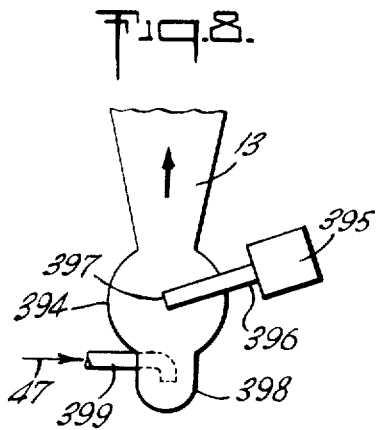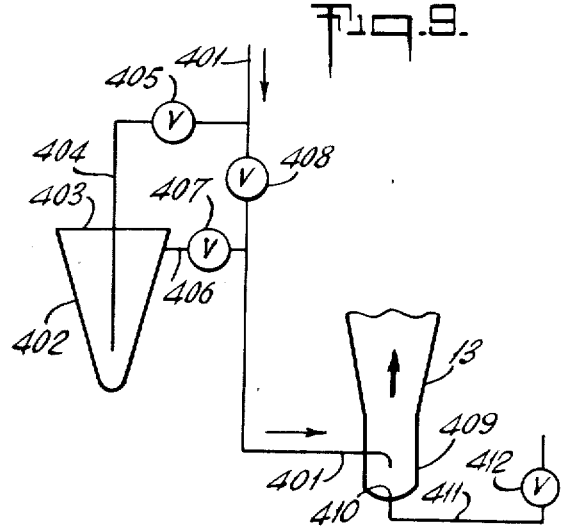

PROCESS FOR PRODUCTION OF CRYSTALS IN FLUIDIZED BED CRYSTALLIZERS

This is a continuation, of application Ser. No. 861,231, filed Sept. 26, 1969 which is a division of SN 626,749 filed Mar. 29, 1967 now U.S. Pat. No. 3,510,266.

BRIEF SUMMARY OF THE INVENTION

Fluidized bed crystallizers are disclosed in British Pat. No. 865,311.

One objection to operations in accordance with that patent is that seed crystals must be added to the crystallizer as grown crystals are withdrawn. Not only is this addition troublesome to effect without shutting down the crystallizer, but the preparation of such seed crystals is time consuming and expensive, and also usually wasteful of product, due to the concurrent production of fines when reducing some of the grown crystals to the size of seed crystals.

Also, in a fluidized bed crystallizer, if the large crystals that are formed and drop to the bottom of the crystallizer are not removed, the crystallizer will tend to clog up and thus to cease to function as a fluidized bed crystallizer.

If, in a fluidized bed crystallizer, the number of particles therein is not maintained substantially constant, but instead is reduced in number with each withdrawal of crystalline product, the entire bed of particles remaining in the crystallizer eventually becomes oversized and must be removed.

These problems are effectively and simply solved by this invention.

The large, oversize crystals that develop in a fluidized bed crystallizer and fall into the lower portion of the crystallizer, pass into or near a cavitation zone, produced with ultrasonic vibrations, at or near where the large oversize crystals are concentrated or accumulate. The mechanical forces to which such large, oversize crystals are subjected while in or near this cavitation zone serve to fracture the large, oversize crystals into smaller crystals, or fragments or crystals, with the production of a relatively small amount of fines. Hence, there is a negligible loss of desired solid material, as fines, via the liquid outflow at the top of the crystallizer. Also, the product withdrawal, at a point between the bottom of the crystallizer and the top of the fluidized bed in the crystallizer, is of pure crystalline solid material of the desired size range, along with some of the liquid serving to fluidize the solids in the crystallizer, and this product withdrawal may be effected without reducing the total number of particles in the crystallizer to less than the number at the start of the crystallizer operation. As a result, the crystallizer may be run continuously without need for introducing seed crystals into the system after it is once in operation. Also, the pure crystalline product withdrawn from the crystallizer continues to have a substantially uniform size range.

In its more specific aspects, the crystallizer is a generally cylindrical column having an overall height many times the diameter of the upper portion of the column, and with the lower part of the column preferably having a diameter smaller than that of the upper part of the column, and preferably gradually reducing in diameter as one proceeds toward the bottom of the column (i.e., is conically shaped). The ultrasonic transducer or converter, electrically connected to a generator of electrical current of ultrasonic frequency, is located at or near the bottom of such column, and the amount of ultrasonic energy from the electrical generator introduced by that transducer into the liquid in that region is such as to produce a cavitation zone there, into which or near which the oversize crystals eventually move. The magnitude of the mechanical forces to which these crystals are subjected when in or near the cavitation zone is such as to fracture or break the oversize crystals, frequently along cleavage planes of the crystals, and thereby to substantially reduce their size, with the concomitant production of a relatively small amount of fines.

Above the bottom of the crystallizer column, and preferably at a point in the conically shaped or tapered portion of the crystallizer column, significantly above the bottom of the crystallizer column, is a valved opening through which some of the fluid in the crystallizer column is withdrawn, preferably intermittently as conditions are favorable for such withdrawal. The fluid so withdrawn is separated into solid and liquid phase, as by filtration, and the crystals removed from the liquid by the filter are the product of the crystallizer, and are pure and substantially uniform in size range, shape and weight. The filtrate is returned to a dissolver, to which is also returned the fluid that passes out the top of the crystallizer column. In the dissolver, crude solids, of heterogeneous size, weight and shape, are added to restore the fluid to a saturated, or near saturated, solution. Also, the dissolver is preferably heated so that the temperature of the solution leaving the dissolver is at a uniform, elevated temperature. The saturated, or near saturated, solution leaving the dissolver is then preferably filtered to remove any particles that may be in it at that time, and then is passed through a heat exchanger to cool the solution a carefully selected amount to produce a desired degree of supersaturation.

This supersaturated solution is then introduced, under pressure, into the bottom of the crystallizer column.

There is thus a continuous flow of fluid through the system of which the crystallizer column is a part; there is regular addition to the system of crude solids in heterogeneous size and weight, without shutting down the system; there is withdrawal of pure product regularly from the crystallizer column without shutting down the system, such product, after filtration, being crystals having a substantially uniform size range and weight; there is no inefficiency due to the production in the crystallizer of a significant amount of fines of the desired product which would be carried up to the top of the crystallizer and pass out therefrom, as the amount of fines of the desired product produced by this invention is relatively small; and there is no need, after the crystallizer is initially seeded and placed in operation, for any additional seed to be added to the crystallizer. In explanation of this last feature, the ultrasonic transducer at the bottom of the column fractures or breaks the oversize crystals that reach the bottom of the column into smaller size crystals. These smaller size crystals then migrate upwardly into the column, and so replace the particles that are withdrawn from the crystallizer when product is withdrawn. Any fines that are produced as a result of the crystal break-up wash out of the column, but as the amount of fines produced is small, the loss of particles by washover is negligible.

In its still more specific aspects, the ultrasonic transducer or converter is mounted below the bottom of the column of the fluidized bed crystallizer, with the probe or step horn that is mechanically vibrated axially by the transducer or converter extending upwardly through a hole in the bottom of the column and with the upper end of such probe or step horn substantially flush with the inside surface of the bottom of the column but not in contact with such bottom. The ultrasonic transducer or converter is supported at a node point of the probe or step horn, the support including a suitable liquid seal, such as an O-ring. The probe or step horn between such support and the bottom of the column is enclosed in a separate chamber. Preferably the liquid introduced into the lower portion of the fluidized bed crystallizer to effect fluidization of the crystals therein is first passed through this separate chamber. Consequently, there tends to be a flow of liquid from the separate chamber upwardly through the clearance between the bottom of the column and the probe or step horn, so that it is difficult for solids to pass downwardly through such clearance into such separate chamber. Nevertheless, if any solids do pass downwardly through such clearance and into such separate chamber, they are swept out from the separate chamber by the flow of fluidizing liquid therethrough and returned by the fluidizing liquid to the crystallizer. This sweeping out of the separate chamber is continuous while the crystallizer is in operation.

The invention is particularly useful in extracting from a liquid solution of racemic solid material, a crystalline material of the desired levo- or dextro-rotatory property and having a relatively uniform size range. This is effected by introducing, as seed at the start of the operation, crystals of the desired rotatory characteristic.

In the most refined utilization of the invention, two fluidized bed crystallizers are employed, generally arranged serially as the flow of the liquid therethrough, with one crystallizer seeded with dextro-rotatory seed and the other crystallizer seeded with levo-rotary seed. Hence, while the feed to the system is of a racemic material, the product from one crystallizer is dextro-rotatory material, and the product from the other crystallizer is levo-rotatory material.

BRIEF DESCRIPTION OF THE DRAWINGS

The invention is described in conjunction with the accompanying drawings, in which:

FIG. 6 is a vertical sectional view of another filter apparatus usable with the dissolver of the system of FIG. 5;

FIG. 7 is a vertical sectional view of still another filter apparatus usable with the dissolver of the system of FIG. 5;

FIG. 8 is a diagrammatic view of the lower portion of a fluidized bed crystallizer showing a modification in which the ultrasonic transducer projects into the size of a chamber at or near the bottom of the crystallizer, and FIG. 9 is a diagrammatic view of the lower portion of a fluidized bed crystallizer without an ultrasonic transducer, and illustrating a method of adding seed crystals to the crystallizer while it is in operation.

DETAILED DESCRIPTION

Single Crystallizer System — FIGS. 1 - 4

Figure 1:
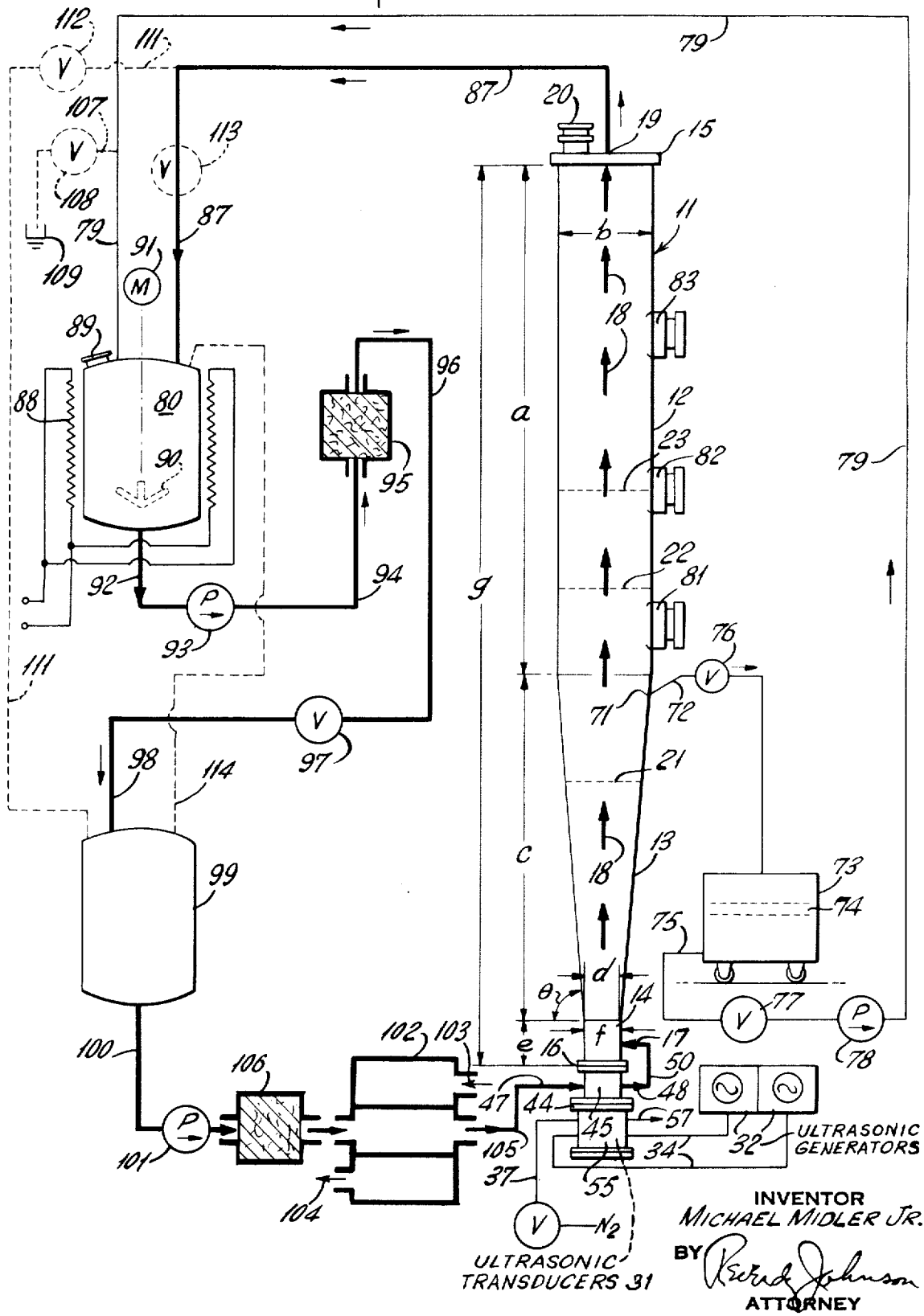
FIG. 1 is a diagrammatic flow chart of an embodiment of the invention employing a single fluidized bed crystallizer, the crystallizer here shown being a preferred form of apparatus constructed and operating in accordance with the invention.

Referring to FIG. 1 of the drawings, the fluidized bed crystallizer generally designated 11 includes:

i. a main cylindrical portion 12, in the form of an elongated hollow cylindrical column or tube having an axial length $a$ and an internal diameter $b$;

ii. a tapered portion 13, in the form of an inverted frustum of a hollow cone, positioned just below the main cylindrical portion 12, having an axial length $c$ and tapering from an internal diameter of $b$ at the top, to an internal diameter of $d$ at the bottom; and iii. a lower cylindrical portion 14, in the form of a short hollow cylindrical column, positioned just below the tapered portion 13 and having an axial length $e$ and an internal diameter $f$.

The overall height of the column of the crystallizer 11 is indicated as $g$, and is the sum of the lengths $a$, $c$, and $e$. The height $c$ of the tapered portion 13 is preferably a substantial part of the overall height $g$, from about 15 to about 60 percent of the overall height. The diameter $b$ at the top of the tapered portion 13 is preferably of the order of two to four times the diameter $d$ at the bottom of the tapered portion and most preferably about three times the diameter $d$. The angle, $\theta$, between the inner wall of the tapered portion 13 of the column, and the horizontal, is relatively large, being greater than 63°, and preferably 83° and 89°.

Figure 2:
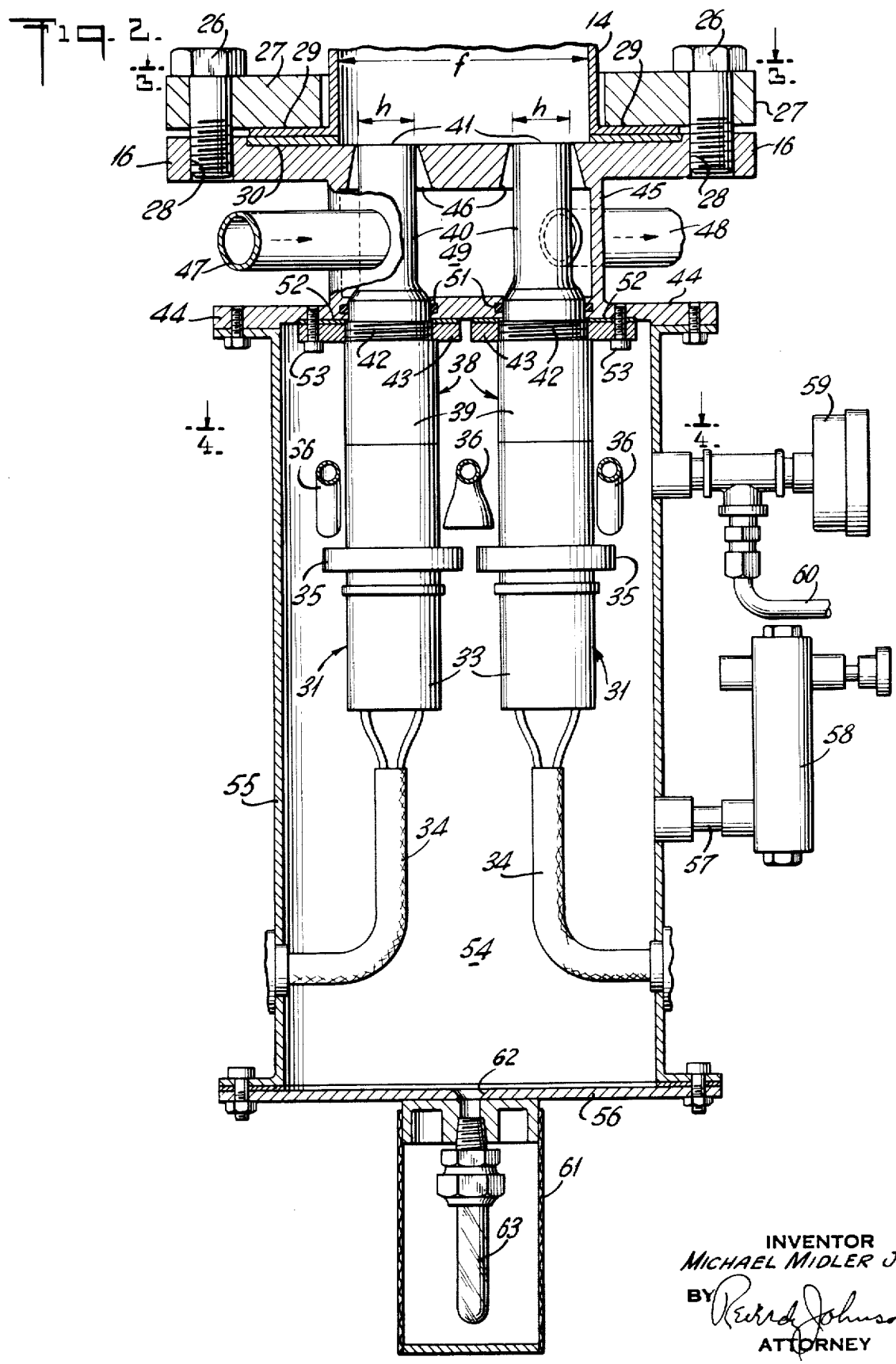
FIG. 2 is an enlarged vertical sectional view of the bottom of the crystallizer shown in FIG. 1, showing two ultrasonic transducers mounted below the bottom of the crystallizer, with their step horns projecting up through apertures in the bottom of the crystallizer.

The top of the crystallizer is closed by a cover 15, and the bottom of the crystallizer is closed by a plate 16 (see FIG. 2). The flow of liquid, containing a solid in supersaturated solution in the liquid, is introduced, under pressure, into the lower cylindrical portion 14 of the crystallizer, as at 17.

This liquid moves upwardly through the crystallizer as indicated by the arrows 18, and leaves the crystallizer at the top, as at 19. Due to the tapered portion 13, the velocity of the liquid in the crystallizer is greatest at the bottom of the crystallizer. The cover 15 has a normally closed access opening 20 through which seed crystals, preferably of the same solid material that is in supersaturated solution in the liquid, are initially introduced into the crystallizer, before the liquid is circulated through the crystallizer. These seed crystals are introduced in sufficient quantity to form a seed bed which, when static, has its top level approximately as illustratively shown by the broken line 21. When this seed bed is fluidized by the flow of liquid up through the crystallizer, the top level of the seed bed may rise approximately to the level indicated by the broken line 22.

The particles of seed are not, in practice, all of exactly the same size. Hence, when the crystallizer is thus operated, with the seed bed fluidized by the upward flow of liquid supersaturated with solids, three events occur;

1. The particles of seed tend to stratify in the crystallizer at levels related to their size and weight, the larger-size, heavier-weight particles assuming levels which are below those of the smaller-size, lighter-weight particles;

2. Some of the solids in supersaturated solution in the fluidizing liquid crystallize out onto the suspended particles, thereby increasing the weight and size of such particles, so that these increased-weight-and-size particles tend to migrate to a lower level in the crystallizer, commensurate with their new weight and size; and 3. The bed of suspended particles (comprising seed particles and particles which have increased in weight and size over their original seed weight and size) expands so that the top level of the fluidized bed of particles moves upwardly in the crystallizer. Indicative of the top level of the expanded, fluidized bed of particles is the broken line 23.

In time some crystals become of sufficient weight and size to migrate to the very bottom of the crystallizer. Heretofore, it has been the practice to collect such crystals upon a screen near the bottom of the crystallizer prior to removal. After a short period of operation the crystallizer has then usually been shut down, in prior practices, to effect such removal. If the crystals on the screen are not removed, they tend to clog up and impede the flow of the fluidizing liquid passing up through the screen, and thus to impair the operation of the crystallizer, and eventually, to cause the crystallizer to cease to function altogether.

Even when, in the past, the crystals which migrated to the bottom of the crystallizer were removed, it was customary to introduce additional seed crystals into the crystallizer. This was done to replace the crystals withdrawn, so that there is no depletion in the number of particles of desired solid in the crystallizer, on which crystal growth may take place. Necessarily, the seed crystals must be smaller in size and lighter in weight than the crystals withdrawn from the bottom of the crystallizer. hence, some processing, such as grinding, of some of those withdrawn crystals is required if this seed is to be obtained from those withdrawn crystals.

Continuing now with the description of this invention, and referring to FIGS. 2, 3 and 4 in addition to FIG. 1, there is positioned below the bottom plate 16 of the crystallizer 11 one or more ultrasonic transducers or converters generally designated 31, two being shown in outline in FIG. 2. These convert ultrasonic electrical energy, derived from a suitable generator 32, to mechanical vibrations of the same frequency, the details of this conversion being well understood and form no part of this invention, so are not described. The transducer or converter unit itself is inside a suitable case 33, from which extends the cable 34 connecting the transducer unit with the generator 32. The case has a cooling ring 35 against which a gaseous coolant is directed by the nozzles 36 connected to a pipe 37 leading to a source of such coolant (not shown).

The upper portion of the transducer 31 consists of a horn, generally designated 38, that preferably has a cylindrical base 39 of one diameter and preferably has a cylindrical upper portion 40 which usually has a diameter different from that of base 39. In the transducer shown, the diameter of the upper portion 40 of horn 38 is smaller than the diameter of the base 39 of the horn. The horn 38 is oscillated by the transducer unit at ultrasonic frequency, with the maximum amplitude of the vibrations being at the tip 41 of the upper portion 40.

At a point on the horn of minimum oscillation (i.e., at a node point), the lower portion 39 has threads 42 on its outer surface by means of which the entire ultrasonic transducer is mounted upon, and supported by, a mounting plate 43. Each horn 38 has its own mounting plate 43. This mounting plate is in turn secured to a lower plate 44 that is parallel with the crystallizer bottom plate 16 and secured below that plate 16 by an annular wall 45 connecting lower plate 44 with the crystallizer bottom plate 16.

The crystallizer bottom plate 16 is secured to the lower cylindrical portion 14 of the crystallizer 11 by means of bolts 26 which pass through suitable openings in an annular ring 27 and then screw into threaded holes 28 in the bottom plate 16. The annular ring 27 is welded to a radially extending flange 29 at the bottom of cylindrical portion 14, such welding being done before the top lip of cylindrical portion 14 is welded to the bottom lip of tapered portion 13. When bolting the bottom plate 16 onto the crystallizer, an annular washer 30 is positioned between the flange 29 and the plate 16.

The crystallizer bottom plate 16 has two circular apertures 46 therein, slightly larger in diameter, at the upper surface of plate 16, than the diameter $h$ of the tip 41 of horn 38. The dimensions of the various parts are such that the cylindrical upper portion 40 of each horn 38 projects upwardly through its corresponding aperture 46 sufficiently for the tip 41 of the horn to be flush, or substantially flush, with the upper surface of plate 16, or, in other words flush, or substantially flush, with the bottom of the crystallizer 11.

The annular wall 45 has two pipes 47 and 48 connected thereto and communicating with the chamber 49, formed by plates 16 and 44 and wall 45, beneath the bottom of the crystallizer 11. Pipe 48 is connected by pipe 50 (see FIG. 1) to the input 17 of the crystallizer, and pipe 47 is the line through which the fluidizing liquid is brought to the crystallizer. Hence, the fluidizing liquid passes through chamber 49 before it is introduced into the crystallizer itself. Some of the fluidizing liquid passes from chamber 49 upwardly past the annular clearance between the tip 41 of each sonifier horn 38 and the wall of the corresponding aperture 46, and so into the bottom of the crystallizer, without passing through pipes 48, 50 and 17.

A liquid-tight seal, such as an O-ring 51, is provided for each horn 38 to engage the cylindrical base portion 39 of horn 38 as it passes through lower plate 44. Hence, the liquid in the chamber 49 does not leak down below the plate 44.

Between each mounting plate 43 and the lower plate 44 is a washer or gasket 52, preferably of a suitable synthetic elastomer, such as chloroprene rubber (marketed under the trademark "Neoprene"). Each mounting plate 43 is secured to the lower plate by three threaded bolts 53 arranged equi-angularly around its associated horn 38, (of which only one bolt 53 is shown in FIG. 2 for each horn). Hence, by suitable adjustment of these three bolts 53 against the resilience of the washer 52, the tip 41 of each horn may be centered in its associated aperture 46.

The portions of the two transducers 31 below lower plate 44 are encased within a transducer chamber 54 formed by annular tube 55 and a bottom cover 56. The coolant gas, in this case nitrogen, directed by the nozzles 36 against the cooling rings 35, enters this chamber by pipe 37, fills this chamber 54 and then exits through a pipe 57, the flow being metered by the flow meter 58. The pressure in the chamber is indicated by a gauge 59, and tube 60 leads to a pressure-controlled switch, not shown, for actuation to shut down the generators 32 if the pressure of the coolant falls below a safe operating value. The reason for this high degree of protection is that the fluidizing liquid for the crystallizer is frequently an inflammable solvent, so that it is desirable to insure that the transducers do not heat up to a temperature which might be hazardous.

For the same reason, the bottom cover 56 of the transducer chamber 54 has an opening 62 communicating with a downwardly extending sight glass 63, so that if any of the fluidizing liquid for the crystallizer does leak down into the transducer chamber 54, it will flow into the sight glass and its presence be observed, whereupon appropriate safety and corrective measures will be taken. The sight glass has a protective screen 61 around it to protect it from mechanical injury.

Between the top cover 15 of the crystallizer 11 and its bottom plate 16 (see FIG. 1), and preferably at a point below the top of the fluidized bed of crystals and significantly above the bottom plate 16, and also preferably along the tapered portion 13 of the crystallizer, is a product withdrawal opening 71. This is connected to a pipe 72 leading to a movable vessel 73 having a filter 74 and a connection 75 for withdrawing the filtrate from the bottom of the vessel. A valve 76 is provided in pipeline 72 and a valve 77 is provided in pipeline 75. From valve 77 the filtrate is moved by filtrate pump 78 and pipe 79 to the dissolver tank 80.

The main cylindrical portion 12 of the crystallizer is provided with one or more sight openings, of which three, 81, 82 and 83, are shown in FIG. 1. These openings enable the operator of the crystallizer to observe the inside of the crystallizer and check on its operation, and especially on the height of the fluidized bed in the crystallizer. If, for example, he observes that the fluidized bed has risen from level 22 (i.e. from below sight opening 82) to level 23 (i.e. to opposite sight opening 82), he opens valve 76 and withdraws sufficient fluid from the crystallizer into the vessel 73 to lower the fluidized bed to below sight opening 82, after which he closes the valve 76.

The crystallizer 11 is preferably covered on its outside with electric heating wires and thermal insulating material (for simplicity not shown) in order to maintain the wall of the crystallizer at a desired temperature higher than saturation temperatures and therefore to minimize crystallization on the wall.

The fluid leaving the crystallizer 11 at its top, at exit 19, is conveyed by pipe 87 to the dissolver tank 80. There the fluid is heated, as diagrammatically indicated by the electric heating wires 88. There also new, crude solid material is fed into the dissolver through opening 89, and the solution thoroughly mixed by agitator 90 driven by motor 91. Preferably the amount of the solids added is such that a saturated, or near saturated, solution is maintained in the dissolver. This may involve the formation of a slurry containing an appreciable amount of solids.

The liquid in dissolver 80 is withdrawn through pipe 92, and passed through pump 93 and pipe 94 and then through filter 95. The filtrate of filter 95 — which is a clear, particle-free, saturated, or near saturated, solution of the solid material introduced into dissolver 80 — is passed through pipe 96, valve 97 and pipe 98 to a heat exchanger 102. Preferably a holding tank 99 is interposed between pipe 98 and the heat exchanger 102, in which case the liquid passes through the holding tank 99, pipe 100, fluidizing pump 101 and filter 106 before reaching the heat exchanger 102. The heat exchanger 102 cools the saturated, or near saturated, solution a carefully controlled amount to produce a solution which is supersaturated with respect to the material added as a solid in the dissolver. The coolant for the heat exchanger enters the unit at 103 and exits at 104. This supersaturated solution exits the heat exchanger by pipe 105 and flows through pipe 47 to the bottom of the crystallizer 11, preferably first passing through chamber 49, as shown and as described above.

The holding tank 99, when employed, serves to insure a constant supply of liquid for fluidizing pump 101 if, for any reason, there is a temporary interruption in the flow of luquid from the dissolver 80 or through the filter 95.

The simplest filtering means for withdrawing the desired clear and particle-free, saturated, or near saturated, solution from the dissolver 80 and feeding it to the input pipe 100 of the fluidizing liquid pump 101, is by the use of one or more filters (not illustrated) that are located internally of the dissolver tank 80. Typical of such a filter is a tubular, fritted-glass filter that is supported by a tube or pipe at its top and has its tubular fritted-glass filter element extending down into the liquid of the tank. The supporting tube or pipe is connected to the input pipe 100 of the fluidizing liquid pump 101, so that the pump sucks fluid from the dissolver 80 inwardly through the pores of the filter. If more than one such filter is employed, they would be connected in parallel before connecting them to pipe 100.

When the volume of fluidizing liquid per unit of time becomes substantial, the number of such tubular, fritted-glass filters that are needed becomes sufficient to require a dissolver tank 80 having an inconveniently large top surface area. A filtering means external to the dissolver tank 80 is then desirable, such as diagrammatically illustrated at 95.

It is important to successful operation that the volume of flow of the fluidizing liquid (i.e., the velocity of the fluidizing liquid at a given point in the system) be maintained uniform with the passage of time. Hence, either the fluidizing liquid pump 101 should be a good metering pump, or else there should be a flow controller in the system between pump 101 and the input 47 to the crystallizer.

The pressure under which the fluidizing liquid is introduced into the bottom of the crystallizer is moderate, as it should not be so high as to prevent, or to significantly impair, the formation of the cavitation zone at the tip of the sonifier. A satisfactory pressure range is from 5 to 50 pounds per square inch.

The fluidizing liquid used must be one in which the material to be crystallized is soluble, but not too soluble nor too insoluble for the practical operation of good crystallization from such liquid.

Also, the fluidizing liquid must not be so dense or so light relative to the fluidized particles as to substantially impair the fluidization of the particles in the crystallizer, nor so non-volatile as to require excessive power density in order to create an effective cavitation zone at the tip of the sonifier. For most crystals, some common solvents that are satisfactory are the following:

Acetonitrile
n-Butanol
2B Ethanol
Isopropanol
70% Isopropanol — 30% Water
Methanol Summary of Operation - FIGS. 1 – 4

In view of the detailed nature of the foregoing description of the invention, a summary of its operation is believed sufficient, and is as follows:

Assume, for simplicity, that steady state conditions have been attained in the system, and that crude solid material is fed into dissolver tank 80 through its opening 89, either continuously or at regular intervals. These solids are mixed in the dissolver with the fluidizing liquid flowing through the system, and a saturated, or near saturated, solution is formed and maintained in the dissolver. Depending on the solubility characteristics of the solid material in the fluidizing liquid used, this may involve the formation and maintenance of a slurry in the dissolver.

This output of dissolver 80 is filtered to obtain a clear, particle-free liquid, and this is pumped by pump 101 to the heat exchanger 102, where the liquid is cooled to produce a supersaturated solution. The supersaturated solution is fed to the bottom of the crystallizer 11, where it enters the crystallizer column under pressure, flows to the top, and then leaves the coluumn at 19. The liquid is then returned to the dissolver tank 80 by pipe 87.

While rising in the crystallizer 11, the liquid fluidizes and suspends the bed of crystals in the lower portion of the crystallizer, and some of the material in supersaturated solution in the liquid, crystallizes out of solution onto the crystals that are suspended in the liquid. Such crystals therefore increase in size and weight.

The individual crystals that are suspended in this fluidizing liquid tend to migrate to levels in the crystallizer according to their size and weight, particularly in the tapered portion 13 of the column. This is because the velocity of the fluidizing liquid varies in the tapered portion 13 of the column, being greatest at the lower end, where the diameter is $d$, and being lowest at the upper end, where the diameter is $b$. Hence, the larger particles tend to migrate to the lower portion of the bed, while the smaller crystals tend to migrate to the upper portion.

As the material from the supersaturated solution deposits upon the fluidized crystals in the crystallizer, the bed of crystals expands upwardly. When the top of the fluidized bed reaches the level of the sight glass 82, valve 76 in the product withdrawal line 72 is opened. A mixture of liquid and crystals (these crystals being the desired product) is then withdrawn from the crystallizer at a point which is appreciably above the bottom of the crystallizer, and passed into the vessel 73. The valve 76 is closed, to terminate the withdrawal of this product mixture, when the top of the fluidized bed of crystals falls in appropriate distance.

In the vessel 73 the crystals, constituting the desired product, are separated from the liquid by the filter 74, and the filtrate is pumped, by filtrate pump 78, back to the dissolver tank 80. The crystals so obtained, as product, are substantially uniform in size range and weight.

Crystals in the fluidized bed of crystals that are appreciably larger and heavier than the desired crystalline product are in the lower part of the tapered portion 13 of the crystallizer 11, and the heaviest and largest of these reach the bottom 16 of the crystallizer column. There these oversize crystals pass into or near one of the cavitation zones produced by the ultrasonic vibrations of the tips 41 of the ultrasonic transducers 31 (see FIG. 2). While in or near this cavitation zone these oversize crystals are subjected to mechanical stresses of such high intensity and rapidity that they fracture, often along cleavage planes of the crystals, into two or more smaller pieces, with the production of a relatively small amount of fines. The pieces into which each oversized crystal is fractured then migrate upwardly to levels in the fluidized crystal bed commensurate with their size and weight. Hence, the crystal bed is replenished automatically with small crystals (i.e., seed) on which crystallization takes place, without the need for (i) preparing seed crystals externally of the system and then (ii) introducing such seed crystals into the crystallizer from time to time. Furthermore, as the fracturing of the over-size crystals by the ultrasonic cavitation zone produces a relatively small amount of fines, there is little or no loss of fines out through the top of the crystallizer.

Of course, before starting the system, an initial supply of seed crystals must be introduced into the crystallizer 11 through the access opening 20. Once the system is in operation, however, no additional seed need be added to the crystallizer 11. The only solids fed to the system are the crude solids, which are introduced into the dissolver tank 80 through opening 89.

The system of FIG. 1 can operate, in the manner described, continuously for many hours, or even for a number of days, without introducing new seed.

Also, in some cases, the sonifier need not be run continuously while the system is operating continuously. This would occur when the crystal break-up achieved by the sonifier, in relation to the rate of formation of over-sized crystals, and the rate of withdrawal of product, is such that intermittent operation of the sonifier produced sufficient new particles or seed. Illustrative of such intermittent operation of the sonifier is operation for thirty seconds out of every ninety seconds, and operation for one minute out of every six minutes.

Modifications of System of FIG. 1

Certain modifications of the system of FIG. 1 as described above may be made and are described below. Some of these are shown in dotted outline in FIG. 1. The system may be provided with a purge line to prevent excessive accumulation in the system of impurities contained in the crude solids introduced into the dissolver tank 80. This can be, for example, a small pipe 107 and valve 108 connected to pipe 79 for bleeding into a drain 109 a very small portion of the filtrate as it is returned to the dissolver tank 80.

The system may be provided with a by-pass line 111 connecting pipe 87 with holding tank 99, this by-pass line containing a valve 112. When such a by-pass line is provided, there is also provided in line 87, between by-pass line 111 and the dissolver tank 80, a valve 113. During the normal operation of the system, valve 113 is open and valve 112 is closed, so that the by-pass line 111 is ineffective. However, when it is desired to suspend the normal operation of the system, as for example at nights and weekends when no one is present to feed crude solids to the dissolver tank 80 and to supervise the operation of the system, valve 113 is closed and valve 112 is opened. This causes the fluidizing liquid coming from the top of the crystallizer 11, to bypass the dissolver tank 80 and pass directly to the holding tank 99. While this bypass 111 is in use, the flow of coolant to the heater exchanger 102 may also be dicontinued. Hence, while the bed of crystals in the crystallizer 11 is maintained fluidized during the period of suspension of the system, no crystallization occurs as the fluid input to the crystallizer is not a supersaturated solution.

A pipe 114 may be provided to connect the top of holding tank 99 with the top of the dissolver 80 so that any overflow of the holding tank is returned to the dissolver.

The system may dispense with pipes 48, 50 and 17 and so pass all of the fluidizing liquid into the bottom of the crystallizer 11 through the annular clearance between the tip 41 of each sonifier horn and the wall of the corresponding aperture 46.

The supersaturation produced in the fluidizing liquid just before it is introduced into the crystallizer 11 has been described as achieved by cooling the fluidizing liquid as it passes through the heat exchanger 102. This is the preferred manner. However, other known ways of producing supersaturation may be used, such as by evaporation, or by the introduction of a gas into the fluidizing liquid.

Product withdrawal has been described as effected at an opening 71 that is located significantly above the bottom plate 16 of the crystallizer 11, and preferably along the tapered portion 13 of the crystallizer. When prolonged steady-state operation of the crystallizer is not important, product withdrawal may be effected at or very near the bottom of the crystallizer. Under these conditions the larger size particles in the crystallizer are withdrawn from the crystallizer, with very few of the smaller size crystals being withdrawn (as they are not at the bottom of the crystallizer). In time, the bottom of the crystallizer becomes depleted of the larger size crystals, since most are withdrawn as product, and a few are broken up by the sonifier, and the rate of crystallization is generally not sufficient to produce the larger size crystals in the quantity necessary to replace the total of the amount of larger size crystals withdrawn as product or broken up. In time, therefore (and assuming the flow rate of the fluidizing liquid remains constant), the number of larger size crystals capable of falling to the sonifier diminishes to zero. The bed of particles is not replaced by new particles, and therefore the number of particles in the bed diminishes, with successive product withdrawals, until the system is no longer workable.

It is therefore much preferred to withdraw the product at a point significantly above the bottom of the crystallizer, so that the product withdrawn is a mixture of crystal sizes. As a general rule, balancing all factors that are concerned, it is preferred to withdraw the product at a point such that from 5 to 75 percent, by weight, of the fluidized crystals, is below the product withdrawal point.

Illustrative Crystallizers

The following are details of four crystallizers, A, B, C and D, that embody this invention:

| Detail | Crystallizer A | Crystallizer B | Crystallizer C | Crystallizer D |
|---|---|---|---|---|
| Composition of crystallizer column (i.e., the material of which it is made) | Glass | Stainless steel (Type 316 with interior walls polished) | Glass (except tapered portion is stainless steel) | Glass |
| a-Height of main cylindrical portion-inches | 60 | 72 | 72 | 60 |
| b-Internal diameter of same-inches | 3 | 12.78 | 3 | 3 |
| c-Height of tapered portion-inches | 68 | 56 | 56 | 50 |
| d-Internal diameter of bottom of same-inches | 1 | 4.26 | 1 | 1.5 |
| e-Height of lower cylindrical portion- inches | 6 | 14 | 8 | 6 |
| f-Internal diameter of same-inches | 1 | 4.26 | 1 | 1.5 |
| g-Over-all height of crystallizer column-inches | 134 | 142 | 136 | 116 |
| h-Diameter of tip 41 of sonifier horn-inches | 0.5 | 1 | 0.5 | 0.5 |

TABLE —Continued

Figure 3:
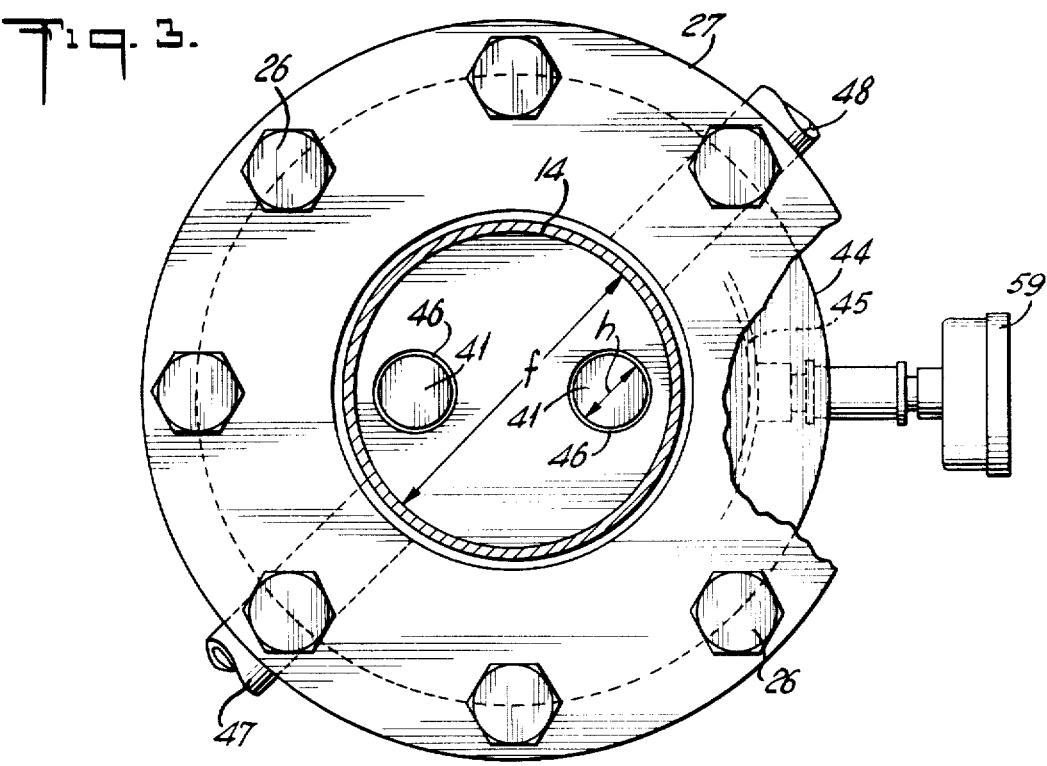
FIG. 3 is a horizontal section taken along the line 3—3 of FIG. 2, with a portion broken away.
Figure 4:
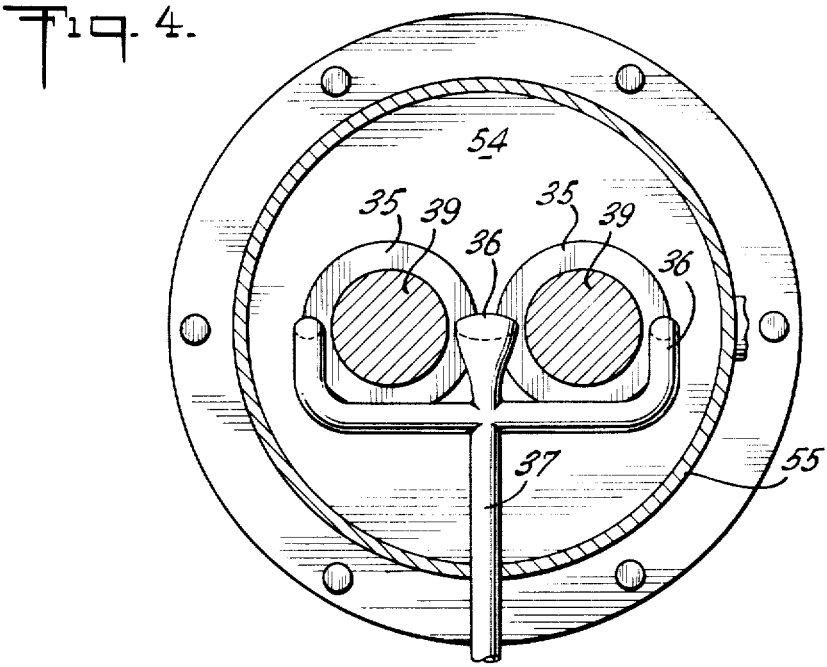
FIG. 4 is a horizontal section taken along the line 4—4 of FIG. 2.

| Detail | Crystallizer A | Crystallizer B | Crystallizer C | Crystallizer D |
|---|---|---|---|---|
| Percent of the over-all column height that is the height of the tapered portion ($c/g \times 100$) | 51% | 39% | 41% | 43% |
| $\theta$-Angle of tapered portion to horizontal | 89.2° (Approx) | 85.6° (Approx) | 89° (Approx) | 89.1° (Approx) |
| Column expansion in tapered portion (ratio of diameters d:b) | 1 to 3 | 1 to 3 | 1 to 3 | 1 to 2 |
| Flow rate of fluidizing liquid (liters per minute) | 0.9 | 18.2 (4.85 gals/min) | 1 | 1.2 |
| Number of sonifier horns per crystallizer | 1 (centered in bottom plate 16) | 2 (positioned as shown in FIGS. 2, 3 and 4) | 1 (centered in bottom plate 16) | 1 (centered in bottom plate 16) |
| Maximum ultrasonic power output of generator 32 | 250 watts | 250 watts | 110 watts | 250 watts |
| Maximum ultrasonic power (electrical) actually transmitted to sonifier | 190 watts | 190 watts | 90 watts | 190 watts |
| Maximum actual ultrasonic power density (electrical) per square inch of crystallizer bottom | 242 watts/sq. in. | 27.6 watts/sq. in. | 114 watts/sq. in | 107 watts/sq. in. |
| Frequence of ultrasonic generator 32-cycles per sec. | 19,500 | 19,500 | 20,000 | 19,500 |
| Identification of generator 32 | Branson Model J-17V | Branson Model J-17 (modified to 19,500 cycles per sec.) | Branson Model S-110 | Branson Model J-17V |

Figure 5:
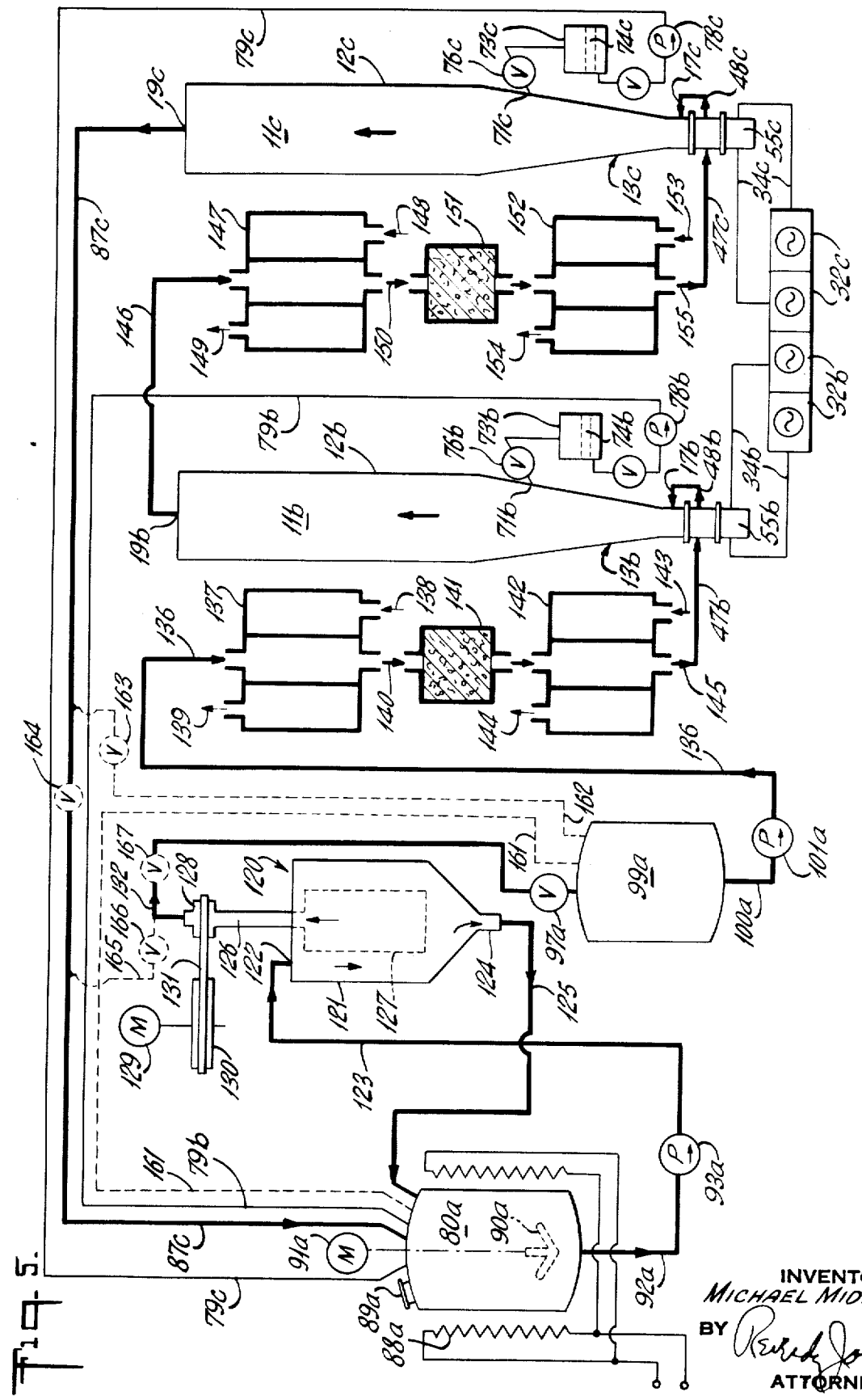
FIG. 5 is a diagrammatic flow chart of an embodiment of the invention employing two fluidized bed crystallizers, each similar to the one shown in FIGS. 1–4, arranged to extract from a liquid solution of racemic solid materials, crystalline material of levo-rotatory property in one crystallizer and crystalline material of dextro-rotatory property in the other crystallizer, this figure including a diagrammatic showing of a non-clogging filter apparatus usable with the dissolver of such a system.

Double Crystallizer System — FIG. 5

When this invention is utilized to resolve a liquid solution of a racemic solid material into levorotatory material and dextro-rotatory material, two fluidized bed crystallizers are preferably employed, each preferably similar to the crystallizer 11, and its associated equipment, shown in FIGS. 1–4 of this application and described above. While the two crystallizers may be arranged to operate in parallel, they are preferably arranged to operate in series. FIG. 5 shows diagrammatically such a system, Some of the details of the crystallizer 11 shown in FIGS. 1–4 are not shown in FIG. 5 in order to avoid unnecessary complexity in FIG. 5, but such details are present in the crystallizers 11b and 11c of FIG. 5.

Elements and apparatus in FIG. 5 which are substantially the same as corresponding elements and apparatus in FIGS. 1–4, are identically numbered, but with a letter suffix added. The suffix $a$ is added to the reference numbers for corresponding elements and apparatus relating to the dissolver and to its associated equipment. The suffix $b$ is added to the reference numbers for corresponding elements and apparatus relating to the first crystallizer in the series system and its associated equipment. The suffix $c$ is added to the reference numbers for corresponding elements and apparatus relating to the second crystallizer in the series system, and to its associated equipment.

Hence, it is evident that dissolver 80a corresponds to dissolver 80 and that crystallizers 11b and 11c correspond to crystallizer 11.

Under some conditions of operation of such a two crystallizer resolution system, it is desirable to have an excess of solids in the dissolver 80a, so that the agitated contents of the dissolver 80a is a slurry. In such cases a standard line filter, such as is represented by 95 in FIG. 1, is not satisfactory, as it soon depletes the dissolver of solids, and further, tends to clog up. It is preferred in such cases to use a liquids-solids separator or non-plugging filter of the general type shown diagrammatically in several different forms in FIGS. 5, 6 and 7 as filters 120, 220, 320, respectively.

The non-plugging filter or liquids-solids separator 120 of FIG. 5 consists of a vertical pressure tank 121 having a slurry inlet 122 near its top. This inlet 122 is connected by pipe 123 to the discharge side of dissolver pump 93a, so that the slurry in dissolver 80a is withdrawn from the bottom of the dissolver through pipe 92a and pumped by dissolver pump 93a through pipe 123 into the slurry inlet 122.

The slurry passes downwardly through the pressure tank 121 and out the slurry outlet 123 at the bottom, from where the slurry passes through pipe 125 to the top of the dissolver 80a, and so is returned to the dissolver.

Axially located at the top of the pressure tank 121 is a hollow shaft 126 carrying a perforated cylinder 127 which is within the pressure tank and which is rotatable about its longitudinal axis. The shaft 126 has a pulley 128 by means of which it is rotated by motor 129, acting through motor driven pulley 130 and belt 131. The lateral side of the cylinder 127 is perforated, and is covered by filter cloth. The upper end of the hollow shaft 126 is connected by pipe 132 to the holding tank 99a through valve 97a.

Consequently, when dissolver pump 93a and fluidizing liquid pump 101a are in operation and motor 129 is rotating the perforated cylinder 127 of the nonplugging filter or liquids-solids separator 120, the slurry in the dissolver tank 80a circulates through the separator 120 (which is kept substantially full of slurry) and a small portion of the liquid of the slurry (but without the suspended solid material) is forced through the filter cloth and out the hollow shaft 126. The solid material does not pass inwardly through the filter cloth on cylinder 127. Rather, it is thrown outwardly off the filter cloth and moves downwardly with the slurry stream, and out the slurry outlet at the bottom of the separator and is returned to the dissolver 80a along with the slurry stream.

The stream of liquid leaving the separator 120 through the hollow shaft 126 and pipe 132 is the desired, clear, particle-free, saturated, or near saturated, solution withdrawn from the dissolver tank 80a and fed to the fluidizing liquid pump 101a.

The holding tank 99a serves to insure a constant supply of liquid for pump 101a if in case, for any reason, the supply from the separator 120 is temporarily interrupted, or temporarily is not flowing at the rate delivered by the pump 101a.

The fluidizing liquid passes from pump 101a through pipe 136 preferably to a heat exchanger 137, where, (when such an exchanger is provided), the fluidizing liquid is heated to a predetermined temperature by heating fluid entering the exchanger at 138 and exiting the exchanger at 139. The heated fluidizing liquid exits the exchanger at 140 and passes through a standard line filter 141, and then into heat exchanger 142. A coolant is introduced into the heat exchanger 142 and 143 and exits at 144, so that the fluidizing liquid is cooled by the heat exchanger 142 to a predetermined temperature to produce a desired degree of supersaturation in the fluidizing liquid. This super-saturated fluidizing liquid exits the heat exchanger 142 at 145, and passes by pipe 47b into the bottom of crystallizer 11b.

Crystallizer 11b is initially seeded with seed crystals of one enantiomorph of the racemic solid material in solution in the fluidizing liquid. Preferably it is the by-product isomer, which is frequently the dextro-rotatory form, so that the description which follows it is assumed that crystallizer 11b is initially seeded with dextro-rotatory material.

Crystallizer 11b operates in the manner previously described for crystallizer 11. Dextro-rotatory material crystallizes out of the fluidizing liquid into the dextro-rotatory seed crystals. These increase in size and weight, and tend to migrate downwardly. Those that become large enough to migrate to the bottom of the crystallizer 11b and into or near the cavitation zone or zones formed there by the tip or tips of the ultrasonic transducer or transducers located at the bottom of the crystallizer 11b, are fractured into smaller crystals, which thereupon are quickly carried upward away from the cavitation zone by the upward flow of the fluidizing liquid there.

The fluidizing liquid exits the crystallizer 11b at 19b. At this point the liquid is no longer supersaturated with the dextro-rotatory form of the solid material (or, at least, not as much supersaturated as when the fluidizing liquid entered the crystallizer 11b), but is still supersaturated with the levo-rotatory form.

The fluidizing liquid from crystallizer 11b then passes through pipe 146 to heat exchanger 147, where the fluidizing liquid is reheated to a predetermined temperature. Heating fluid for the exchanger 147 enters at 148 and exits at 149. The reheated fluidizing liquid exits the exchanger at 150, and passes through a standard line filter 151 and then into heat exchanger 152. A coolant is introduced into the heat exchanger 152 at 153 and exits at 154, so that the fluidizing liquid is cooled by the heat exchanger 152 to a predetermined temperature to produce a desired degree of supersaturation of the levo-rotatory form of material in the fluidizing liquid. This supersaturated fluidizing liquid exits the heat exchanger 152 at 155, and passes by pipe 47c into the bottom of crystallizer 11c.

Crystallizer 11c is initially seeded with seed crystals of the other enantiomorph of the racemic solid material in solution in the fluidizing liquid. Preferably it is the desired end product isomer, frequently the levo-rotatory form. Since, in the preceding description of crystallizer 11b it was assumed that it had been seeded with dextro-rotatory material, it is assumed in the following description that crystallizer 11c is initially seeded with levo-rotatory material.

Crystallizer 11c operates in the manner previously described for crystallizer 11. Levo-rotatory material crystallizes out of the fluidizing liquid onto the levo-rotatory seed crystals. These increase in size and weight, and tend to migrate downwardly. Those that become large enough to migrate to the bottom of the crystallizer 11c and into or near the cavitation zone or zones formed there by the tip or tips of the ultrasonic transducer or transducers located at the bottom of the crystallizer 11c, are fractured into smaller crystals, which thereupon are quickly carried upward away from the cavitation zone by the upward flow of the fluidizing liquid there.

The fluidizing liqid exits the crystallizer 11c and 19c. At this point the liquid is no longer super-saturated with the levo-rotatory form of the solid material (or, at least, not as much supersaturated as when the fluidizing liquid entered the crystallizer 11c). Also, the content of the dextro-rotatory form in the fluidizing liquid at exit 19c is the same as when it entered crystallizer 11c.

The fluidizing liquid exiting from crystallizer 11c to 19c is then returned by pipe 87c to the dissolver 80a. Here the returned fluidizing liquid is restored to its initial ratio of equal amounts of dextro-rotatory and levo-rotatory material in solution, and the concentration of such material in solution in the returned fluidizing liquid is increased to the desired level.

Upon opening valve 78b, some of the fluidizing liquid is withdrawn from crystallizer 11b into the vessel 73b, where it is filtered by filter 74b to remove the crystals of dextro-rotatory material from the liquid. The filtrate is pumped by pump 78b through pipe 79b back to the dissolver 80a.

Upon opening valve 76c, some of the fluidizing liquid is withdawn from crystallizer 11c into the vessel 73c, where it is filtered by filter 74c to remove the crystals of levo-rotatory material from the liquid. The filtrate is pumped by pump 78c through pipe 79c back to the dissolver 80a.

The system of FIG. 5 thus serves to resolve the racemic input into dissolver 80a into dextro-rotatory crystals as the output of crystallizer 11b, and levorotatory crystals as the output of crystallizer 11c. Furthermore, the system, after the crystallizers 11b and 11c are initially seeded with the dextro-rotatory and levorotatory material, respectively, can operate in this fashion continuously without preparing and introducing additional seed into either crystallizer. "Continuously" is a period of many days, or even of several weeks.

Miscellaneous Modifications of the System of FIG. 5

Several modifications of the system of FIG. 5 as described above are useful, and are shown in dotted outline in FIG. 5, and described below.

A pipe 161 connects the top of holding tank 99a with the top of dissolver 80a so that any overflow of the holding tank is returned to the dissolver.

A pipe 162 connects the top of holding tank with pipe 87c, through a valve 163.

In pipe 87c, downstream from the connection to pipe 162, is a valve 164. Downstream from that valve 164 is a pipe 165 which connects with the outlet 132 of the liquids-solids separator or non-plugging filter 120. In this pipe 165 is a valve 166, and in pipe 132 is a valve 167.

Under normal operations valves 164 and 167 are open and valves 163 and 166 are closed. Hence, the pipes 162 and 165 shown in dotted outline carry no flow, and so are ineffective.

When it is desired to suspend operations, for example, during the overnight period, without impairing the normal operation of the system during the daytime, valves 164 and 167 are closed and valves 163 and 166 are opened. The temperature controls of the fluidizing liquid may remain unchanged, i.e., heat exchangers 137, 142, 147 and 152 remain unchanged in their heating and coolant temperatures. Under such conditions, the dissolver 80a is effectively by-passed, as the fluidizing liquid from the outlet 19c of the second crystallizer 11c flows through open valve 163 and pipe 162 into the holding tank 99a. The fluidizing liquid is thus circulated from the holding tank 99a through the crystallizers 11b and 11c in series and back to the holding tank. Supersaturation of the fluidizing liquid at the output of the temperature-lowering heat exchangers 142 and 152 is gradually depleted as crystallization occurs in the crystallizers 11b and 11c and the fluidizing liquid is not replenished with additional racemic material (the replenishing not occurring as the dissolver 80a is now removed from the flow path). This depletion, however, does not reduce below saturation the concentration of the material dissolved in the fluidizing liquid entering the crystallizers 11b and 11c, so that the flow of the fluidizing liquid through the crystallizers 11b and 11c during the time the dissolver 80a is by-passed, does not dissolve the seed crystals in those crystallizers.

Preferably the ultrasonic generators 32b and 32c are maintained in operation while the supersaturation is being eliminated. Thereafter, these generators may be turned off.

After the supersaturation in the fluidizing liquid has been completely eliminated, the system can be completely shut down, if desired, by stopping the pumps 93a and 101a and the motors 91a and 129.

Purification of Crystallizers of FIG. 5

If, for any reason, a crystallizer during normal operations becomes contaminated with crystals of the opposite enantiomorph, the crystallizer may be purified in a relatively simple fashion without shutting down the system and replacing the contaminated seed bed with a pure seed bed.

Assume, for example, that crystallizer 11b, which is seeded with dextro-rotatory material, becomes contaminated with some levo-rotatory crystals. To purify crystallizer 11b, first the dissolver 80a is isolated from the rest of the system, in the manner described four paragraphs above, by closing valves 164 and 167 and opening valves 163 and 166.

Then the heat exchanger 142 is adjusted so that the temperature of the fluidizing liquid leaving the heat exchanger 142 is raised above the temperature of the fluidizing liquid leaving heat exchanger 152, with the result that crystallizer 11b operates at a higher temperature than that of crystallizer 11c. The increase in temperature is relatively small — of the order of a few degrees. Column 11b thus tends to act like the dissolver 80a. Some of the solid material in column 11b, both dextro-rotatory material and levo-rotatory material, dissolves into the fluidizing liquid passing through crystallizer 11b and is carried out by that fluidizing liquid over to the crystallizer 11c. There the normal operation of that crystallizer 11c, in conjunction with the heat exchanger 152 which cools the fluidizing liquid to a supersaturation temperature before it is introduced into crystallizer 11c, and in conjunction with the levo-rotatory crystals already present in crystallizer 11c, crystallizes out the levo-rotatory material carried by the fluidizing liquid, but does not crystallize out the dextro-rotatory material. The latter remains in solution as the fluidizing liquid passes through crystallizer 11c, pipe 87c, valves 163, pipe 162, holding tank 99a, pipe 100a and pump 101a and heat exchangers 136 and 142 back to crystallizer 11b. There the fluidizing liquid dissolves some more of the levo-rotatory material that is present in the column 11b, and the cycle is repeated to transfer that levo-rotatory material to column 11c.

When, by appropriate tests, it is determined that crystallizer 11b no longer contains any levo-rotatory material, (or when the bed height in crystallizer 11c stops growing), the purification of crystallizer 11b is completed. The heat exchanger 142 is then adjusted so that the temperature of the fluidizing liquid leaving heat exchanger 142 is lowered to its original value, and the valves 163 and 166 closed and valves 164 and 167 opened, to return the system to normal operating conditions.

Purification of the crystallizer 11c is effected in an analogous fashion, which is believed unnecessary to detail.

The advantages of purification of the crystallizers in the manner described are not only that purification may be effected without shutting down the system and removing the contaminated seed bed and replacing it with a pure seed bed, but also (a) that there is no need to eliminate supersaturation in the fluidizing liquid, (b) that the purification capacity is unlimited and (c) that no material is lost in the process. In explanation of the last advantage, note that the dextro-rotatory material in the seed bed of crystallizer 11b that is dissolved out of the seed bed and into the fluidizing liquid during purification of crystallizer 11b, is never permanently lost, but is redeposited in crystallizer 11b when the system is returned to normal operating conditions.

Unequal Production Rates With System of FIG. 5

Under some conditions of operation of the system of FIG. 5 in conjunction with other processes, it may be desirable to produce more dextro-rotatory material than levo-rotatory material. This can occur, for example, when the dextro-rotatory material is processed, outside of the system of FIG. 5, to produce racemic material, which racemic material is then fed to the dissolver 80a of FIG. 5. If such racemization of the dextro-rotatory material is not complete, the feed to dissolver 80a of FIG. 5 in such case will consist of material which has more dextro-rotatory content than levo-rotatory content. Consequently, for continuous operation of the system of FIG. 5 when fed with material of this type, the output of crystallizer 11b producing dextro-rotatory crystals must exceed the output of crystallizer 11c producing levo-rotatory material.

This can be readily accomplished by operating crystallizer 11b (a) with the temperature of the fluidizing liquid therein a little lower than the temperature of the fluidizing liquid in crystallizer 11c, or (b) with its seed bed a little higher than the seed bed of crystallizer 11c, or (c) with a combination of these two differences.

Further Modification of System of FIG. 5

Under certain conditions it is possible to operate a two crystallizer column resolution system such as shown in FIG. 5, without a liquids-solids separator or non-plugging filter of the type represented by 120 in FIG. 5. Rather, a simple line filter, such as represented by 95 in FIG. 1, is satisfactory.

These conditions are such as to obviate the need for maintaining a slurry in the dissolver 80a. These conditions can be achieved by introducing into the dissolver 80a racemic material at the same rate as the resolved material is withdrawn from the crystallizers 11b and 11c. Preferably this is achieved by the use of an automatic feed for dissolver 80a which is controlled by the amount of resolved material produced by the crystallizers.

However, when the economics do not justify the automation involved, the maintenance of slurry in dissolver 80a is the preferred mode of operation, so that a liquids-solids separator of the type represented by 120 is then preferably employed.

Other Forms for Liquids-Solids Separator 120 of FIG. 5; FIGS. 6–7

One alternative form of liquids-solids separator that may be substituted for the unit 120 of FIG. 5, is the unit 220 shown in FIG. 6. It consists of a pressure tank having a slurry inlet 222, a slurry outlet 224, a filtrate outlet 232, and a motor driven shaft 126 extending from outside the tank 221, at the top, to the interior of the tank.

Inside the tank is a cylindrical wire mesh tube 270 stationarily supported around its bottom edge upon a horizontal plate 271 that forms a partition between the main cylindrical body of the tank 221 and its downwardly bulged bottom cover 272. The top of tube 270 is closed by a cover 273, and from this cover is supported, inside the tube 270, a closed center cylinder 274. The diameter of this center cylinder 274 is such that the annular space 275 between the cylindrical surface of center cylinder 274 and the inside surface of tube 270 is relatively small. The bottom of cylinder 274 does not reach to the plate 271. Centered in plate 271 is an opening 276 that connects with the filtrate outlet 232.

Suitably secured to the cylindrical wall of the wire mesh tube 270 (preferably on its exterior) is filter cloth 277 made of suitable material, such as canvas or polytetrafluoroethylene, the latter being commonly known by its trademark "Teflon."

The slurry from pipe 123 enters the tank 221 through the slurry inlet 222 in top cover 278, and passes downwardly into the annular space 279 between the cylindrical wall of tank 221 and the filter cloth 277 on the cylindrical wall of the wire mesh tube 270. At the bottom of annular space 279 the plate 271 has a series of holes 280 which enable the slurry to pass from that space 279 into the space 281 between the plate 271 and the bottom cover 272. From space 281 the slurry leaves the unit 220 by outlet 224 and returns to the dissolver 80a by pipe 125.

Some of the fluidizing liquid of the slurry passes through the filter cloth 277 into the annular space 275, the solids content of the slurry being retained on the exterior of the filter cloth. The liquid which passes through the filter cloth 277 contains a saturated solution of the solid material added to dissolver 80a of FIG. 5. The filtrate, after reaching annular space 275, passes down to the bottom plate 271, through the opening 276 and out the filtrate outlet 232 to the pipe 96a, where the filtrate passes on to the holding tank 99a of FIG. 5.

To prevent the solids which do not pass through the filter cloth from accumulating and bridging over the annular space 279, a cylindrical grid 282 is positioned in that space. This grid has a top radial portion 283 which is secured to the lower portion of the shaft 126 that extends into the tank 221. The bottom of shaft 126 has a bearing 284 supporting this shaft, and also the grid 282 secured thereto, upon the top cover 273 for the stationary cylindrical wire mesh tube 270. Hence, during operation of the system of FIG. 5, motor 129 rotates shaft 126 of the liquids-solids separator 220, and this keeps agitated the slurry in the annular area 282 and also prevents any cake that adheres to the filter cloth from bridging over the space 279.

Without especially careful construction of the wire mesh tube 270, the grid 282 and the rotating support for grid 282, and without especially careful mounting of the filter cloth 277 on the exterior of the tube 270, the rotating grid 282 does not prevent solids buildup on the filter cloth 277. some solids accumulate on the filter cloth, and this accumulated cake impairs the filter-action of the filter cloth, even before the cake is up enough to be dislodged, in whole or in part, by the rotating grid 282. Hence it is preferred to remove the cake buildup by a periodic backwash of the filtrate line, for example for 1 minute every hour. This backwash may be effected by pumping fluidizing liquid from holding tank 99a through line 96a into the unit 220, using a separate pump and suitable valves to place the backwash pump into the line during this backwash period.

The function of the closed center cylinder 274 is to reduce the available volume in the liquids-solids separator unit 220 for the filtrate, so that the hold-up of the filtrate in the unit is a minimum.

Another alternative form of liquids-solids separator that may be substituted for the unit 120 of FIG. 5, is the unit 320 shown in FIG. 7. It consists of a pressure tank 321 having a slurry inlet 322, a slurry outlet 324, a filtrate outlet 332, and a motor driven shaft 126 extending from outside the tank 321, at the top, to the interior of the tank.

Inside the tank is a cylindrical wire mesh tube 370 stationarily supported around its bottom edge upon a horizontal plate 371 that forms a partition between the main cylindrical body of the tank 321 and its downwardly bulged bottom cover 372.

Suitably secured to the cylindrical wall of the wire mesh tube 370 (preferably on its exterior) is filter cloth 377 made of suitable material, such as canvas or polypropylene.

This can be effected by taking the filter cloth, in sheet form, and, after rolling it into a cylindrical tube, securing the ends together, and then sliding the tube of filter cloth, thus formed, over the wire mesh tube 370. Thereafter a cylindrical grill, formed in sections, can be bolted together over the tube of filter cloth to hold it in place. The upper end of tube 370 has a sliding liquid-tight seal with the inwardly facing surface 385 of an annular ring 386 at the top of the cylindrical portion of tank 321. Hence, when bottom cover 372 is unbolted around its periphery from the cylindrical portion of tank 321, the plate 371 is movable downwardly so that the tube 370 and the filter cloth 377 surrounding it are movable downwardly and out of the tank 321, thereby enabling ready replacement of the filter cloth.

Inside the cylindrical tube 370 is a solid cylinder 387 secured at its top to the lower end of shaft 126. Shaft 126 and its cylinder 387 are supported upon the top cover 388 by a bearing diagrammatically shown at 389. The bottom of cylinder 387 has a shaft 390 projecting downwardly therefrom, and this shaft 390 seats in a suitable bearing in the plate 371.

The cylindrical surface of solid cylinder 387 has longitudinal ribs 391 which project radially outwardly nearly to the inner surface of tube 370, leaving a small annular space 392 between them.

The plate 371 has a series of holes 380 in it positioned in a circle coaxial with the tube 370 but at a slightly shorter radius. As a consequence, the slurry, after entering the unit 320 at the inlet 322, passes up through these holes 380 and up into the space 392. After traveling along the axial length of the tube 370, the slurry passes out the unit through the slurry outlet 324 at the top.

Some of the fluidizing liquid of the slurry passes through the filter cloth 377 into the annular space 379 between the exterior of the filter cloth 377 and the inside of the cylindrical portion of tank 321, the solids content of the slurry being retained on the interior of the filter cloth. The liquid which passes through the filter cloth 377 contains a saturated solution of the solid material added to dissolver 80a of FIG. 5. This filtrate, after reaching annular space 379, passes up to near the top of the cylindrical portion of tank 321, where it then leaves the unit through the filtrate outlet 332. From there the filtrate moves by pipe 96a to the holding tank 99a of FIG. 5.

Instead of backwashing the filtrate through the filter cloth 377 to dislodge solid material which has accumulated on the filter cloth during the operation of the unit, a nitrogen pulse may be employed periodically for a short time, such as for 15 seconds every five minutes. To do this, valve 97a (FIG. 5) is closed and nitrogen, at a small pressure in excess of the pressure under which the slurry enters the unit at the slurry inlet 322, is applied to the line 132. This causes the filtrate to exert a back pressure on all portions of the filter cloth, causing the accumulated cake on the inside of tube 370 to fall off into the space 392 and be carried upward and away by the circulating slurry stream. This nitrogen pulse, and the concomitant operation of valve 97a, may be effected automatically by a suitable timing mechanism.

Modification of Bottom of Crystallizer; FIG. 8

The bottom of the crystallizer according to this invention may be constructed as shown diagrammatically in FIG. 8. A spherical section 394 is secured to the bottom of the tapered portion 13 of the crystallizer, with its diameter about twice that of diameter $d$. The ultrasonic transducer 395 (corresponding to transducer 31 of FIGS. 1-5) is mounted at the side of the spherical section 394 with its horn 396 (corresponding to horn 38) projecting through the wall of the section so that the horn tip 397 (corresponding to tip 41) is about at the center of the spherical section. A short cylindrical column 398 having its lower end closed, is secured at its top to the bottom of the spherical section 394. An input pipe 399 projects through the cylindrical wall of this short column 398 and has its inner end turned downwardly. The outer end of input pipe 399 connects with the pipe 47 feeding the fluidizing liquid to the crystallizer.

The ultrasonic cavitation zone created at the tip 397 of ultrasonic transducer 395 fractures the oversize crystals that migrate from the tapered portion 13 of the crystallizer down into the spherical portion 394. The pieces into which the oversized crystals have been broken moved upwardly into the crystallizer with the fluidizing liquid entering the crystallizer by way of input pipe 399. The oversize crystals thus do not accumulate at the bottom of the crystallizer and impair, and eventually stop, the flow of the fluidizing liquid into the crystallizer. Also, the action of the ultrasonic transducer 395 in fracturing the oversize crystals serves automatically to replenish the crystallizer with seed to take the place of particles removed from the crystallizer when a product drop is made.

In a further modification, the bottom of the crystallizer shown in FIG. 8 may include a short cylindrical column interposed between the bottom of the tapered portion 13 and top of the spherical section 394. This would correspond to the short cylindrical column 14 of FIG. 1.

Seed Addition Without Stopping Crystallization; FIG. 9

FIG. 9 illustrates diagrammatically what can be done if seed is to be added to a fluidized bed crystallizer without shutting down the crystallizer. Adjacent to the line 401 through which the fluidizing liquid passes on its way to the bottom of a crystallizer having a tapered portion 13, is a closed seed addition vessel 402, in the form of a hollow, inverted cone. Through the removable cover 403 of the vessel a pipe 404 projects downwardly to near the apex of the cone. The outer end of pipe 404 is connected, through valve 405, to pipe 401. Near the top of the vessel another pipe, 406, connects the vessel, through a second valve 407, to pipe 401. A third valve, 408, is positioned in line 401 between the connection from valves 405 and 407 to line 401. Valve 405 connects with pipe 401 upstream of valve 407. In normal operation, valves 405 and 407 are closed and valve 408 is open. When seed crystals are to be added to the crystallizer (only the tapered portion 13 is shown), the cover 403 of the seed additional vessel 402 is removed, the seed crystals are added to the vessel, the cover 403 replaced, and then valves 405 and 407 opened, and valve 408 partially or wholly closed. The resulting flow of fluidizing liquid through the vessel 402 carries the seed crystals contained therein into the crystallizer.

While this arrangement enables the addition of seed to the crystallizer, without shutting the crystallizer down, to replace crystals removed from the crystallizer by a product drop, this arrangement does not take care of the oversize crystals that migrate to the bottom of the crystallizer. To avoid accummulation of these oversize crystals in the short cylindrical column portion 409 at the bottom of tapered portion 13, the product withdrawal opening for the crystallizer is positioned at the bottom of portion 409 of the crystallizer, as shown at 410. Pipe 411 connects with this opening, and has valve 412 therein. Opening 410, pipe 411 and valve 412 take the place of opening 71, pipe 72 and valve 76, respectively, of FIG. 1. In operation, the bottom of portion 409 of the crystallizer must be monitored to watch for an accumulation of oversize crystals there, and when this occurs, valve 412 must be opened to withdraw them along with a product withdrawal, before the accumulation becomes so great as to prevent or impair the withdrawal of product there.

Illustrative Examples of Use

While this invention is of general application to fluidized bed crystallizers, it is of particular value in situations (a) where the desired end product of the fluidized bed crystallizer is a crystalline material of a particular shape and size, or size range, or (b) where the desired end product of the fluidized bed crystallizer is a crystalline material of one of two enantiomorphs present in a racemic mixture. The examples set forth below illustrate these situations, and are outlined in this table:

| Ex. No. | Number of Crystallizers | Product Crystallized | Fluidizing Liquid | Identification of Crystallizer Used |
|---|---|---|---|---|
| 1 | 1 | Amitriptyline | Dry isopropanol | A |
| 2 | 2 | DL-N-Acetyl Aminonitrile | Methanol | B |
| 3 | 2 | Same | Same | C |
| 4 | 2 | Same | Same | C Modified |
| 5 | 2 | Same | 70% Isopropanol; 30% water | C Modified |

-Continued

| Ex. No. | Number of Crystallizers | Product Crystallized | Fluidizing Liquid | Identification of Crystallizer Used |
|---|---|---|---|---|
| 6 | 2 | DL-Acetamido-(p-hydroxyphenyl)-propionitrile | Methanol | C |

EXAMPLE 1

Converting Very Small Size Crystalline Material of Needle-like Shape to Crystalline Material of Coarser Size and Less Needle-like in Shape A single fluidized bed crystallizer having the details set forth previously for crystallizer A, was arranged in a system essentially as shown in FIG. 1.

The material processed was 5-(3-dimethylaminopropylidene)-dibenzo [a,d] [1,4] cycloheptadiene, commonly known as amitriptyline.

The fluidizing liquid (i.e., solvent for the product) was dry isopropanol. To maintain anhydrous conditions, a molecular sieve was inserted in the flow line directly after fluidizing liquid pump 101, and before filter 106. Another heat exchanger (for heating) was inserted in line 87 between the crystallizer exit 19 and the dissolver 80.

The material added to the crystallizer 80 was crystalline material of very small size and needle-like in shape.

The temperature of the liquid in the dissolver 80 was maintained at 45°C., while the temperature of the fluidizing liquid leaving the heat exchanger 102 was maintained at 28°C.

The product withdrawal point was in the tapered portion C of the column, about 15 inches above the bottom of the tapered portion.

The sonifier was in operation continuously during the operation of the fluid bed crystallizer, After initially seeding the crystallizer with 1200 grams of seed, no additional seed was added.

The crystalline product was larger in size, and less needle-like in shape. In other words, the length of the crystals was longer and the ratio of their length to width had decreased.

In terms of mesh sizes, the input material all passed No. 200 mesh (i.e., all was smaller than 74 microns), while the output material (product) all passed No. 18 mesh (i.e., was smaller than 1000 microns) but all was retained on No. 70 mesh (i.e., was larger than 210 microns).

During the continuous run of 48 hours, the amount of product withdrawn was 8650 grams.

EXAMPLE 2

Extracting Dextro-rotatory and Levo-rotatory Material from Racemic Material

Two fluidized bed crystallizers were arranged in a system essentially as shown in FIG. 5. Each crystallizer had essentially the details set forth previously for crystallizer B.

The liquids-solids separator or filter 120 was constructed essentially as shown in FIG. 7.

Heat exchanger 137 (heater) was not used, and filter 141 was positioned in the line of flow directly after the heat exchanger 142 (cooler).

The material processed was DL-α-acetamido-α-vanillyl propionitrile, also known as DL-N-acetyl aminonitrile.

The fluidizing liquid was methanol.

The temperature of the liquid in the dissolver 80a was maintained at 30°C., and the dissolver contained excess solids, so that the output of the dissolver 80a passing through pump 93a was a slurry.

The temperature of the fluidizing liquid leaving the heat exchanger 142 (cooler) for entry into the first crystallizer 11b was maintained at 25°C.

The temperature of the fluidizing liquid leaving the first crystallizer 11b was heated to 30°C. by heat exchanger 147, and then the temperature of the fluidizing liquid was cooled to 25°C. by heat exchanger 152 for entry into the second crystallizer 11c.

The first crystallizer 11b was initially seeded with 50 kilograms of dextro-rotatory seed, while the second crystallizer 11c was initially seeded with 50 kilograms of levo-rotatory seed. No additional seed was added to either crystallizer during the operation of the system.

At least one of the two sonifiers in each of the crystallizers 11b and 11c was in operation continuously during the operation of the crystallizers, and most of the time both sonifiers for each crystallizer were in operation.

The product withdrawal points were near the tops of the tapered portions 13b and 13c.

The product of crystallizer 11b was dextro-rotatory material having a particle size range from about 135 to about 700 microns, with an average particle size of about 550 microns.

The product of crystallizer 11c was levo-rotatory material having a particle size range from about 135 to about 700 microns, with an average particle size of about 550 microns.

Runs of from 60 to 100 hours per week, with operations suspended over the weekends, were made for 5 consecutive weeks, and a total of about 400 hours of operation. The amount of product produced per crystallizer averaged about 2 kilograms per hour. The D-isomer product had a minimum product purity of 97.2%, while the L-isomer product had a minimum product purity of 98.9%. The D-crystallizer (11b) was on purification cycle about 2 per-cent of the operating time while the L-crystallizer (11c) was on purification cycle less than 0.5 percent of the operating time.

EXAMPLE 3

Extracting Dextro-rotatory and Levo-rotatory Material from Racemic Material

Two fluidized bed crystallizers were arranged in a system essentially as shown in FIG. 5. Each crystallizer had essentially the details set forth previously for crystallizer C, except that the generator 32 for the sonifier conformed to that used for crystallizer A.

An external liquids-solids separator or filter 120 such as is shown in FIG. 5 was not employed, nor was a pump corresponding to pump 93a employed. Instead, a filter located internally of the dissolver 80a was employed, consisting of several tubular fritted glass filters (not illustrated) with each supported at its top and having its tubular, fritted glass filter element extending down into the liquid of the dissolver. The tops of the filter elements were connected to pipe 100a so that the fluidizing liquid pump 101a sucked fluid from the dissolver 80a inwardly through the pores of the filters.

There were no pumps 78b and 78c to return the filtrate of product withdrawals to the dissolver. This return of filtrate was effected manually.

There was a normally unused bypass line from line 136 to line 146 to enable crystallizer 11b to be bypassed if desired, (suitable valves being included in line 136 and the bypass line). Similarly, there was a normally unused bypass line from line 146 to the dissolver to enable crystallizer 11c to be bypassed if desired, (suitable valves being included in line 146 and the bypass line).

The bypass line 162 for bypassing the dissolver connected line 87c with pipe 100a rather than to the holding tank 99a, as there was no holding tank.

The material processed was DL-α-acetamido-α-vanillyl propionitrile, also known as DL-N-acetyl aminonitrile.

The fluidizing liquid was methanol.

The temperature of the liquid in the dissolver 80a was maintained at 30°C., and the dissolver contained excess solids.

The temperature of the fluidizing liquid leaving the heat exchanger 137 was maintained at 30°C. After passing through filter 141, the temperature of the fluidizing liquid was reduced by the heat exchanger 142 to 25°C., thus producing supersaturation. The fluidizing liquid then entered the first crystallizer 11b.

The temperature of the fluidizing liquid leaving the first crystallizer 11b was heated to 30°C. by heat exchanger 147, and then, after passing through filter 151, the temperature of the fluidizing liquid was cooled to 25°C. by heat exchanger 152 for entry into the second crystallizer 11c.

The first crystallizer 11b was initially seeded with 2000 grams of dextro-rotatory seed, while the second crystallizer 11c was initially seeded with 2000 grams of levo-rotatory seed. No additional seed was added to either crystallizer during the operation of the system.

There was one generator 32 for each crystallizer, so that the sonifier in each crystallizer was operated substantially continuously.

The product withdrawal points were about 2 inches above the tops of the tapered positions 13b and 13c.

The product of crystallizer 11b was dextro-rotatory material having an average particle size of about 450–500 microns.

The product of crystallizer 11c was levo-rotatory material having an average particle size of about 450–500 microns.

A sieve analysis of each of the two products was as follows:

| Retained on Sieve No. | Corresponding Size in Microns | Weight % of Dextro-rotatory Product | Weight % of Levo-rotatory Product |
|---|---|---|---|
| 25 | 710 | 0.4 | 0.2 |
| 30 | 590 | 3.0 | 1.2 |
| 35 | 500 | 40.6 | 25.4 |
| 40 | 420 | 22.0 | 29.8 |
| 45 | 350 | 21.8 | 25.6 |
| 70 | 210 | 12.0 | 15.8 |
| Pan | 0 | 0.4 | 0.8 |

During a continuous run of 54 hours of operation around the clock, the amount of dextro-rotatory product withdrawn from crystallizer 11b was 4,398 grams, with 2,290 grams remaining in the crystallizer at the end of the run. Thus the net amount of dextro-rotatory product produced in the crystallizer 11b in this period was 4,688 grams.

The amount of levo-rotatory product withdrawn from crystallizer 11c during this period was 4,516 grams, with 2,290 grams remaining in the crystallizer at the end of the run. Thus the net amount of levo-rotatory product produced in the crystallizer 11c in this period was 4,806 grams.

EXAMPLE 4

Extracting Dextro-rotatory and Levo-rotatory Material from Racemic Material

Two fluidized bed crystallizers were arranged in a system essentially as shown in FIG. 5. Each crystallizer had essentially the details set forth previously for crystallizer C, except as follows:

a. The tapered portions 13b and 13c were made of glass and were 16 inches long (so that the length of dimension c was 16 inches).

b. The height of the lower cylindrical portion, corresponding to 14 of FIG. 1, was 8 inches (so that the length of dimension e was 8 inches).

The over-all height (g) of the crystallizer columns was thus 96 inches, the percent of the over-all column height that is the height of the tapered portion (i.e., c/g × 100 ) was 16.7% and the angle ($\theta$) of the tapered portion to the horizontal was 86.4° (approximately).

An external liquids-solids separator or filter 120 such as is shown in FIG. 5 was not employed. Instead, a filter located internally of the dissolver 80a was employed, consisting of several tubular fritted glass filters (not illustrated) with each supported at its top and having its tubular, fritted glass filter element extending down into the liquid of the dissolver. The tops of the filter elements were connected to pipe 100a so that the fluidizing liquid pump 101a sucked fluid from the dissolver 80a inwardly through the pores of the filters.

There were no pumps 78b and 78c to return the filtrate of product withdrawals to the dissolver. This return of filtrate was effected manually.

There was a normally unused bypass line from line 136 to line 146 to enable crystallizer 11b to be bypassed if desired, (suitable valves being included in line 136 and the bypass line). Similarly, there was a normally unused bypass line from line 146 to the dissolved to enable crystallizer 11c to be passed if desired, (suitable valves being included in line 146 and the bypass line).

The bypass line 162 for bypassing the dissolver connected line 87c with pipe 100a rather than to the holding tank 99a, as there was no holding tank.

The material processed was DL-$\alpha$-acetamido-$\alpha$-vanillyl propionitrile, also known as DL-N-acetyl aminonitrile.

The fluidizing liquid was methanol.

The temperature of the liquid in the dissolver 80a was maintained at 30°C., and the dissolver contained excess solids.

The temperature of the fluidizing liquid leaving the heat exchanger 137 was maintained at 30°C. After passing through filter 141, the temperature of the fluidizing liquid was reduced by the heat exchanger 142° 25°C., thus producing supersaturation. The fluidizing liquid then entered the first crystallizer 11b.

The temperature of the fluidizing liquid leaving the first crystallizer 11b was heated to 30°C. by heat exchanger 147, and then, after passing through filter 151, the temperature of the fluidizing liquid was cooled to 25°C. by heat exchanger 152 for entry into the second crystallizer 11c.

The first crystallizer 11b was initially seeded with 2,600 grams of dextro-rotatory seed, while the second crystallizer 11c was initially seeded with 2,600 grams of levo-rotatory seed. No additional seed was added to either crystallizer during the operation of the system.

There was only one generator 32 for the two crystallizers, so the sonifier in crystallizer 11b was operated alternately with the sonifier in crystallizer 11c. The length of on-time for each sonifier was several minutes, followed by an off-time of about an equal duration.

The product withdrawal points were about 4 inches above the bottoms of the tapered portions 13b and 13c.

The product of crystallizer 11b was dextro-rotatory material.

The product of crystallizer 11c was levo-rotatory material.

A run was made of 200 hours of operation, this run extending over a period of 11 days, with operations continuous for 24 hours a day but suspended, by bypassing the dissolver, over the intervening weekend.

The amount of dextro-rotatory product withdrawn from crystallizer 11b during this period was 12,100 grams, with 2,000 grams remaining in the crystallizer at the end of the run. Thus the net amount of dextro-rotatory product produced in the crystallizer 11b was 11,500 grams.

The amount of levo-rotatory product withdrawn from crystallizer 11c during this period was 11,700 grams, with 2,000 grams remaining in the crystallizer at the end of the run. Thus the net amount of levo-rotatory product produced in the crystallizer 11c was 11,100 grams.

The amount of racemic material initially introduced into the dissolver 80a, plus the amount added to it during the run, was 28,500 grams, so that total input was 33,700 grams.

At the end of the run the solids content of the dissolver was 3,210 grams, and the solids content of the liquors in the system was 2,560 grams. The figures produce a material balance of 99.2% for the run.

EXAMPLE 5

Extracting Dextro-rotatory and Levo-rotatory Material from Racemic Material

Two fluidized bed crystallizers were arranged in a system essentially as shown in FIG. 5. Each crystallizer had essentially the details set forth previously for crystallizer C, except as follows:

a. The tapered portions 13b and 13c were made of glass and were 16 inches long (so that the length of dimension c was 16 inches).

b. The height of the lower cylindrical portion, corresponding to 14 of FIG. 1, was 4 inches (so that the length of dimension e was 4 inches).

c. The bottom of crystallizer 11b was arranged for seed addition, without shutting down the crystallizer, in the manner illustrated in FIG. 9 and described above, along with product withdrawal at the bottom, as shown and described in connection with FIG. 9.

d. The bottom of crystallizer 11c was provided with a 2 inch diameter spherical portion 394, as shown in FIG. 8, positioned below a 4 inch long cylindrical portion corresponding to 14 of FIG. 1. The horn 396 of the sonifier projected through the wall of the spherical portion in the manner shown in FIG. 8. Also, the input of the fluidizing liquid into the crystallizer was into a short cylindrical column 398 of about 1 inch diameter and about 5 inches long below the bottom of spherical portion 394, as shown in FIG. 8. The product withdrawal opening was positioned about 4 inches above the bottom of the tapered portion 13.

The over-all height (g) of the crystallizer columns (taking as the bottom of the column the bottom of the lower cylindrical portion corresponding to 14 of FIG. 1) was thus 92 inches, the percent of the over-all column height that is the height of the tapered portion (i.e., c/g × 100) was 17.4% and the angle ($\theta$) of the tapered portion to the horizontal was 86.4° (approximately).

An external liquids-solids separator or filter 120 such as is shown in FIG. 5 was not employed. Instead, a filter located internally of the dissolver 80a was employed, consisting of several tubular fritted glass filters (not illustrated) with each supported at its top and having its tubular, fritted glass filter element extending down into the liquid of the dissolver. The tops of the filter elements were connected to pipe 100a so that the fluidizing liquid pump 101a sucked fluid from the dissolver 80a inwardly through the pores of the filters.

There were no filters 141 between heat exchangers 137 and 142, and no filter 151 between heat exchangers 147 and 152.

There were no pumps 78b and 78c to return the filtrate of product withdrawals to the dissolver. This return of filtrate was effected manually.

There was a normally unused bypass line from line 136 to line 146 to enable crystallizer 11b to be bypassed if desired, (suitable valves being included in line 136 and the bypass line). Similarly, there was a normally unused bypass line from line 146 to the dissolver to enable crystallizer 11c to be bypassed if desired, (suitable valves being included in line 146 and the bypass line).

The bypass line 162 for bypassing the dissolver connected line 87c with pipe 100a rather than to the holding tank 99a, as there was no holding tank.

The material processed was DL-$\alpha$-acetamido-$\alpha$-vanillyl propionitrile, also known as DL-N-acetyl aminonitrile.

The fluidizing liquid was 70 percent isopropanol and 30 percent water, by weight.

The temperature of the liquid in the dissolver 80a was maintained at 40.4°C., and the dissolver contained excess solids.

The temperature of the fluidizing liquid leaving the heat exchanger 142 (cooler) for entry into the first crystallizer 11b was maintained at 35°C.

The temperature of the fluidizing liquid leaving the first crystallizer 11b was heated to 40.4°C. by heat exchanger 147, and then the temperature of the fluidizing liquid was cooled to 35°C. by heat exchanger 152 for entry into the second crystallizer 11c.

The first crystallizer 11b was initially seeded with 1,000 grams of levo-rotatory seed, while the second crystallizer 11c was initially seeded with 1,000 grams of dextro-rotatory seed. Additional seed was added to crystallizer 11b during the operation of the system. No additional seed was added to crystallizer 11c during the operation of the system.

The sonifier in crystallizer 11c was in operation continuously during the operation of the crystallizer.

The product withdrawal point for crystallizer 11b was about 4 inches above the bottom of the tapered portion 13b.

The product of crystallizer 11b was levo-rotatory material having an average particle size of about 650 microns.

The product of crystallizer 11c was dextro-rotatory material having an average particle size of about 650 microns.

A run was made of 100 hours of operation, this run extending over a period of 11 days, with operations suspended over the weekend and early mornings by bypassing the dissolver.

The amount of dextro-rotatory product withdrawn from crystallizer 11c during this period was 5,417 grams, with 971 grams remaining in the crystallizer at the end of the run. As stated previously, no seed was added to this crystallizer at any time during the run. Thus the net amount of dextro-rotatory product produced in the crystallizer 11c having the sonifier located at its bottom was 5,388 grams.

The amount of levo-rotatory product withdrawn from crystallizer 11b during this period was 5,536 grams, with only 743 grams remaining in the crystallizer at the end of the run. In addition, during the run 291 grams of levo-rotatory seed was added. Thus the net amount of levo-rotatory product produced in the crystallizer 11b having no sonifier located at its bottom, and requiring the preparation of seed and the addition of such seed to the crystallizer, was 4,988 grams.

EXAMPLE 6

Extracting Dextro-rotatory and Levo-rotatory Material from Racemic Material

Two fluidized bed crystallizers were arranged in a system essentially as shown in FIG. 5. Each crystallizer had essentially the details set forth previously for crystallizer C, except that the generator 32 for the sonifier conformed to that used for crystallizer A.

Also, an external liquids-solids separator or filter 120 was not employed. Instead, a filter located internally of the dissolver 80a was employed, consisting of several tubular fritted metal filters (not illustrated) with each supported at its top and having its tubular, fritted metal filter element extending down into the liquid of the dissolver. The tops of the filter elements were connected to pipe 100a so that the fluidizing liquid pump 101a sucked fluid from the dissolver 80a inwardly through the pores of the filters.

The material processed was DL-acetamido-(p-hydroxyphenyl)-propionitrile.

The fluidizing liquid was methanol.

The temperature of the liquid in the dissolver 80a was maintained at 30°C., and the dissolver contained excess solids.

The temperature of the fluidizing liquid leaving the heat exchanger 137 (heater) was maintained at 31°C The temperature of the fluidizing liquid leaving the heat exchanger 142 (cooler) for entry into the first crystallizer 11b was maintained at 26.5°C.

The fluidizing liquid leaving the first crystallizer 11b was heated to 31°C. by heat exchanger 147, and then the temperature of the fluidizing liquid was cooled to 26.5°C. by heat exchanger 152 for entry into the second crystallizer 11c.

The product take offs were a short distance (about 2 inches) above the tops of the tapered portions 13b and 13c.

The first crystallizer 11b was initially seeded with 2,000 grams of dextro-rotatory seed, while the second crystallizer 11c was initially seeded with 2,000 grams of levo-rotatory seed. No additional seed was added to either crystallizer during the operation of the system.

The sonifier in each of the crystallizers 11b and 11c were in operation intermittently during the operation of the crystallizers, i.e., about one-half hour out of every 4 hours.

The product of crystallizer 11b was dextrorotatory material having a particle size range from about 135 to about 700 microns, with an average particle size of about 550 microns.

The product of crystallizer 11c was levo-rotatory material having a particle size range from about 135 to about 700 microns, with an average particle size of about 550 microns.

Runs of from 60 to 100 hours per week, with operations suspended over the weekends, were made for about 3 consecutive months, and a total of about 1,200 hours of operation. The amount of product produced per crystallizer averaged about 30 grams per hour. The D-isomer product had a minimum product purity of 97.0%, while the L-isomer product had a minimum product purity of 98.5%. The D-crystallizer (11b) was on purification cycle about 5 per cent of the operating time, while the L-crystallizer (11c) was on purification cycle less than 0.5 percent of the operating time.

I claim:

1. An improved method of operating a fluidized bed crystallizer that includes a column (i) in which a bed of crystals of a solid product is fluidized by the upward flow therethrough of a fluidizing liquid that is super-saturated with the same solid product, so that some of the product in the fluidizing liquid crystallizes out onto the fluidized crystals, which thereupon increase in size and weight, the fluidizing liquid being fed in such super-saturated condition under pressure from outside the column into the column near its bottom, and (ii) in which some of the crystals on which product from the fluidizing liquid has deposited become sufficiently heavy to migrate downward, against the upward flow of the fluidizing liquid, to the bottom portion of the column, said improvement comprising:

a. bleeding some of the fluidizing liquid from the column at a point below the top of the fluidized bed of crystals so that some of the fluidized crystals are carried out of the column; and
    b. creating in the bottom portion of the crystallizer a cavitation zone vibrating at ultrasonic frequency and of sufficient intensity to cause crystals which reach said bottom portion of the column against the suspending action of the fluidizing liquid, to break into two or more smaller crystals which move upwardly in the column with the upward flow of the fluidizing liquid, with the result that prolonged operation of said crystallizer may be effected, and bleeding of the crystals from the fluidized bed effected during such prolonged operation, without introducing seed crystals into the column to replace crystals withdrawn by such bleeding.

2. An improved method of operating a fluidized bed crystallizer that includes a column (i) in which a bed of crystals of either the dextro-rotatory form or the levo-rotatory form of a solid product is fluidized by the upward flow therethrough of a fluidizing liquid that is super-saturated with respect to the racemic form of said solid product, so that some of the optically rotatory form that corresponds to the optically rotatory form of the fluidized crystals, and which is in supersaturated solution in the fluidizing liquid, crystallizes out onto the fluidized crystals, which thereupon increase in size and weight, the fluidizing liquid being fed in such supersaturated condition under pressure from outside the column into the column near its bottom, and (ii) in which some of the crystals on which product from the fluidizing liquid has deposited become sufficiently heavy to migrate downward, against the upward flow of the fluidizing liquid, to the bottom portion of the column, said improvement comprising:

a. withdrawing from time to time some of the contents of the column at a point significantly above the bottom of the column and below the top of the fluidized bed of crystals so that a mixture of fluidizing liquid and crystals is withdrawn from the column;
    b. filtering the mixture so withdrawn to separate the crystals of the optically rotatory form from the fluidizing liquid, such crystals from such mixture constituting the product of the crystallizer;
    c. creating in the bottom portion of the crystallizer a cavitation zone vibrating at an ultrasonic frequency and of sufficient intensity to cause the crystals of the optically rotatory form which reach said bottom portion of the column against the suspending action of the fluidizing liquid, to fracture into two or more smaller crystals and a negligible amount of fines, all of which move upwardly in the column with the upward flow of the fluidizing liquid;
    d. conveying the fluidizing liquid leaving the column near its top to a dissolver;
    e. replenishing in the dissolver the solid content of the fluidizing liquid so that it leaves the dissolver nearly saturated with respect to the racemic form of the product; and
    f. conveying such fluidizing liquid from the dissolver to the bottom portion of the column and, while so conveying it, saturating it so that it enters the column in supersaturated condition with respect to the racemic form of the product, whereby prolonged operation of the crystallizer to separate one of the optically rotatory forms of the product from the racemic form of the product may be effected without introducing seed crystals of said optically rotatory form into the column to replace crystals withdrawn by step (b) as product.

3. The method of claim 2 in which, in step (f), the fluidizing liquid is sufficiently cooled while being conveyed from the dissolver to the bottom portion of the column to cause the fluidizing liquid to enter the column in supersaturated condition with respect to the racemic form of the product.

4. The method of claim 3 in which, in step (e), the replenishing in the dissolver of the solid content of the fluidizing liquid proceeds to the point where the fluidizing liquid leaves the dissolver saturated with respect to the racemic form of the product.

5. The method of claim 2 in which the filtrate of step (b) is returned to the dissolver.

6. The method of claim 3 in which the filtrate of step (b) is returned to the dissolver.

7. The method of claim 4 in which the filtrate of step (b) is returned to the dissolver.

8. An improved method of operating a fluidized bed crystallizer system that includes a first column which is charged with a bed of crystals of either the dextrorotatory form or the levo-rotatory form of a solid product and a second column which is charged with the other of the dextro-rotatory form or the levo-rotatory form of said solid product (i) in which the beds of crystals are fluidized by the upward flow therethrough of a fluidizing liquid that is supersaturated with respect to the racemic form of said solid product, so that some of the optically rotatory form that corresponds to the optically rotatory form of the fluidized crystals, and which is in supersaturated solution in the fluidizing liquid, crystallizes out onto the fluidized crystals, which thereupon increase in size and weight, the fluidizing liquid being fed in such supersaturated condition under pressure from outside the column into the column near its bottom, and (ii) in which some of the crystals on which product from the fluidizing liquid has deposited become sufficiently heavy to migrate downward, against the upward flow of the fluidizing liquid, to the bottom portion of the columns, said improvement comprising:

a. withdrawing from time to time some of the contents of each column at a point significantly above the bottom of the column and below the top of the fluidized bed of crystals so that a mixture of fluidizing liquid and crystals is withdrawn from the column;

b. filtering the mixture so withdrawn to separate the crystals of the optically rotatory form from the fluidizing liquid, such crystals from such mixture constituting the product of the column;

c. creating in the bottom portion of the column a cavitation zone vibrating at an ultrasonic frequency and of sufficient intensity to cause the crystals of the optically rotatory form which reach said bottom portion of said column against the suspending action of the fluidizing liquid, to fracture into two or more smaller crystals and a negligible amount of fines, all of which move upwardly in said column with the upward flow of the fluidizing liquid;

d. conveying the fluidizing liquid leaving the first column near its top to the second column and from the second column to a dissolver;

e. replenishing in the dissolver the solid content of the fluidizing liquid so that it leaves the dissolver nearly saturated with respect to the racemic form of the product; and f. conveying such fluidizing liquid from the dissolver to the bottom portion of the first column and, while so conveying it, super saturating it so that it enters the column in supersaturated condition with respect to the racemic form of the product, whereby prolonged operation of the crystallizer to separate one of the optically rotatory forms of the product from the racemic form of the product may be effected withou introducing seed crystals of said optically rotatory form into the column to replace crystals withdrawn by step (b) as product.

9. The method of claim 8 in which, in step (f), the fluidizing liquid is sufficiently cooled while being conveyed from the dissolver to the bottom portion of the column to cause the fluidizing liquid to enter the column in supersaturated condition with respect to the racemic form of the product.

10. The method of claim 9 in which, in step (e), the replenishing in the dissolver of the solid content of the fluidizing liquid proceeds to the point where the fluidizing liquid leaves the dissolver saturated with respect to the racemic form of the product.

11. The method of claim 8 in which the filtrates of step (b) are returned to the dissolver.

12. The method of claim 9 in which the filtrates of step (b) are returned to the dissolver.

13. The method of claim 10 in which the filtrates of step (b) are returned to the dissolver.

* * * * *

UNITED STATES PATENT OFFICE
CERTIFICATE OF CORRECTION

PATENT NO. : 3,892,539
DATED : July 1, 1975
INVENTOR(S) : Michael Midler, Jr.

It is certified that error appears in the above-identified patent and that said Letters Patent are hereby corrected as shown below Column 15, line 2 - Delete "123" and in its place add "124".

Column 15, line 65 - Delete "into" and in its place add "onto".

Column 16, line 59 - Delete "to" and in its place add "at".

Column 16, line 66 - Delete "78b" and in its place add "76b".

Column 22, line 49 - The word "not" should be underscored.

Column 23, line 12 - Delete "connection" and in its place add "connections".

Column 23, line 27 - The word "not" should be underscored.

Column 27, line 47 - Delete "dissolved" and in its place add "dissolver".

Column 30, line 50 - The word "no" should be underscored.

Column 32, line 44 - Claim 2 - Delete "saturating" and in its place add "supersaturating".

Signed and Sealed this eleventh Day of May 1976

[SEAL]

Attest:

RUTH C. MASON
Attesting Officer

C. MARSHALL DANN
Commissioner of Patents and Trademarks